US008982255B2

(12) United States Patent
Minami et al.

(10) Patent No.: US 8,982,255 B2
(45) Date of Patent: Mar. 17, 2015

(54) IMAGE PICKUP INCLUDING PHOTOELECTRIC CONVERSION

(71) Applicant: Sony Corporation, Tokyo (JP)

(72) Inventors: Yuichiro Minami, Kanagawa (JP); Michiru Senda, Kanagawa (JP)

(73) Assignee: Sony Corporation, Tokyo (JP)

( * ) Notice: Subject to any disclaimer, the term of this patent is extended or adjusted under 35 U.S.C. 154(b) by 225 days.

(21) Appl. No.: 13/659,941

(22) Filed: Oct. 25, 2012

(65) Prior Publication Data
US 2013/0107092 A1 May 2, 2013

(30) Foreign Application Priority Data
Nov. 1, 2011 (JP) .................................. 2011-240135

(51) Int. Cl.
H04N 3/14 (2006.01)
G11C 7/06 (2006.01)
H04N 5/32 (2006.01)
H04N 5/378 (2011.01)
H04N 5/363 (2011.01)

(52) U.S. Cl.
CPC ................. H04N 5/32 (2013.01); H04N 5/378 (2013.01); H04N 5/363 (2013.01)
USPC ....................... 348/294; 348/307; 365/189.07

(58) Field of Classification Search
CPC ...................................................... H04N 5/232
USPC ............................. 348/294, 307; 365/189.07
See application file for complete search history.

(56) References Cited

U.S. PATENT DOCUMENTS

| 5,227,900 A * | 7/1993 | Inaba et al. ..................... 345/97 |
| 6,801,253 B1 | 10/2004 | Yonemoto et al. |
| 2004/0080644 A1 | 4/2004 | Suzuki et al. |
| 2011/0128428 A1 * | 6/2011 | Takatoku et al. ............. 348/307 |
| 2011/0147596 A1 | 6/2011 | Ishida et al. |
| 2011/0310678 A1 * | 12/2011 | Lin .......................... 365/189.07 |
| 2013/0107088 A1 | 5/2013 | Minami et al. |

FOREIGN PATENT DOCUMENTS

JP 2011-135561 A 7/2011

* cited by examiner

Primary Examiner — Joel Fosselman
(74) Attorney, Agent, or Firm — Wolf, Greenfield & Sacks, P.C.

(57) ABSTRACT

An image pickup unit includes: an image pickup section including a plurality of pixels, each of the pixels including a photoelectric conversion device; and a driving section that includes an amplifier and drives each of the pixels to perform a read out operation intended to read out electric charge obtained by the photoelectric conversion device from the pixel as a signal with use of the amplifier, a pixel reset operation intended to reset electric charge in the pixel, and an amplifier reset operation intended to reset an operation of the amplifier. The driving section drives each of the pixels to allow one or both of end timing of the pixel reset operation and end timing of the amplifier reset operation not to be included in a predetermined power-source potential unstable period.

13 Claims, 26 Drawing Sheets

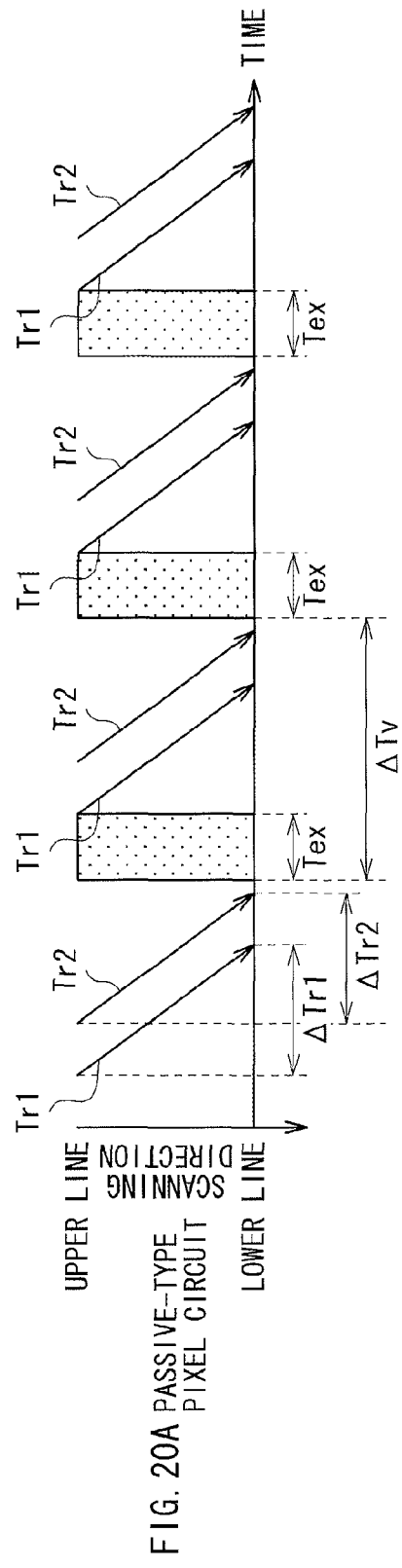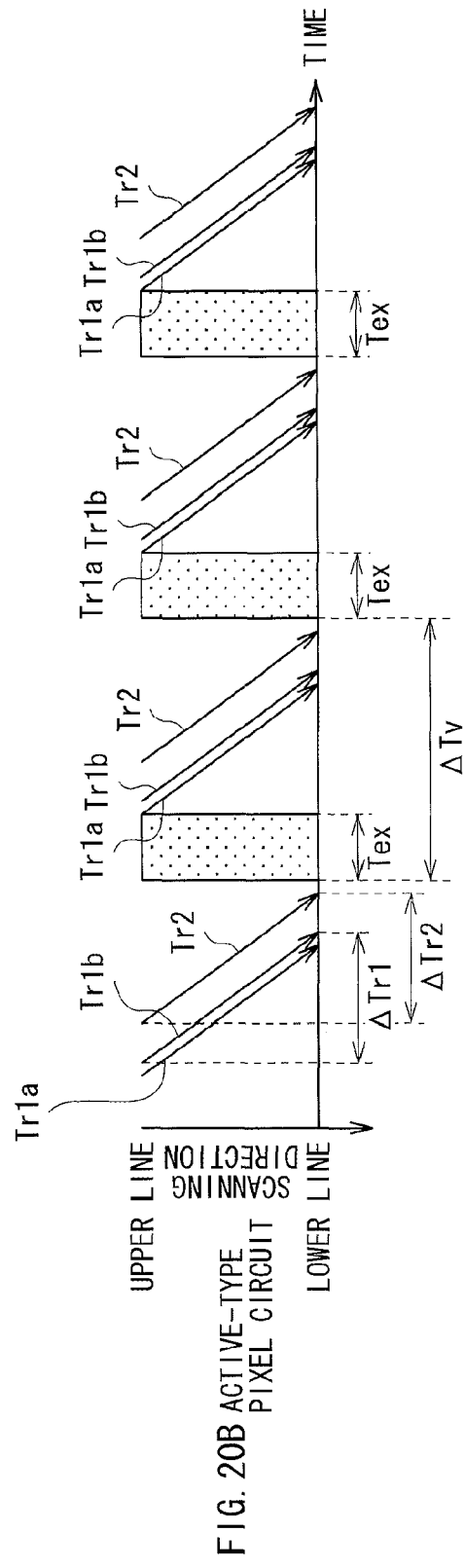
FIG. 20A PASSIVE-TYPE PIXEL CIRCUIT
FIG. 20B ACTIVE-TYPE PIXEL CIRCUIT

IMAGE PICKUP INCLUDING PHOTOELECTRIC CONVERSION

BACKGROUND

The present disclosure relates to an image pickup unit including a photoelectric conversion device, and an image pickup display system including such an image pickup unit.

Various kinds of image pickup units have been proposed as an image pickup unit in which a photoelectric conversion device is incorporated in each pixel (image pickup pixel). For example, Japanese Unexamined Patent Application Publication No. 2011-135561 discloses a so-called optical touch panel, a radiation image pickup unit, and the like, as examples of the image pickup units each including a photoelectric conversion device.

SUMMARY

Incidentally, in general, the above-mentioned image pickup unit drives a plurality of pixels to obtain an image (image pickup driving). Although various methods have been proposed to improve the quality of the image obtained in such a manner, an image pickup unit capable of further improving image quality is desired.

It is desirable to provide an image pickup unit capable of improving the quality of a picked-up image, and an image pickup display system including such an image pickup unit.

According to an embodiment of the disclosure, there is provided an image pickup unit including: an image pickup section including a plurality of pixels, each of the pixels including a photoelectric conversion device; and a driving section that includes an amplifier and drives each of the pixels to perform a read out operation intended to read out electric charge obtained by the photoelectric conversion device from the pixel as a signal with use of the amplifier, a pixel reset operation intended to reset electric charge in the pixel, and an amplifier reset operation intended to reset an operation of the amplifier. The driving section drives each of the pixels to allow one or both of end timing of the pixel reset operation and end timing of the amplifier reset operation not to be included in a predetermined power-source potential unstable period.

According to an embodiment of the disclosure, there is provided an image pickup display system including an image pickup unit and a display that performs an image display based on an image pickup signal obtained by the image pickup unit. The image pickup unit includes: an image pickup section including a plurality of pixels, each of the pixels including a photoelectric conversion device; and a driving section that includes an amplifier and drives each of the pixels to perform a read out operation intended to read out electric charge obtained by the photoelectric conversion device from the pixel as a signal with use of the amplifier, a pixel reset operation intended to reset electric charge in the pixel, and an amplifier reset operation intended to reset an operation of the amplifier. The driving section drives each of the pixels to allow one or both of end timing of the pixel reset operation and end timing of the amplifier reset operation not to be included in a predetermined power-source potential unstable period.

In the image pickup unit and the image pickup display system of the embodiment of the present disclosure, each pixel is driven such that the above-mentioned read out operation, the above-mentioned pixel reset operation, and the above-mentioned amplifier reset operation are performed. At this time, each pixel is driven such that one or both of the end timing of the pixel reset operation and the end timing of the amplifier reset operation are not included in the predetermined power-source potential unstable period. Consequently, a noise component in an image pickup signal due to destabilization of the reset voltage is decreased as compared with the case where the end timing of the pixel reset operation and the end timing of the amplifier reset operation are included in the above-mentioned power-source potential unstable period.

According to the image pickup unit and the image pickup display system of the embodiment of the present disclosure, since each pixel is driven such that one or both of the end timing of the pixel reset operation and the end timing of the amplifier reset operation are not included in the predetermined power-source potential unstable period, it is possible to decrease a noise component in an image pickup signal (or it is possible to improve S/N ratio). As a result, it is possible to improve the quality of a picked-up image.

It is to be understood that both the foregoing general description and the following detailed description are exemplary, and are intended to provide further explanation of the technology as claimed.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the technology.

FIGS. 20A and 20B are timing diagrams showing an example of line-sequential image pickup driving of a pixel circuit of a passive type and an example of line-sequential image pickup driving of a pixel circuit of an active type, respectively.

DETAILED DESCRIPTION

With reference to the drawings, an embodiment of the present disclosure will be described in detail below. It is to be noted that, description will be made in the following order.
1. Embodiment (First Example of Passive Type Pixel Circuit)
2. Modifications
Modification 1 (Second Example of Passive Type Pixel Circuit)
Modifications 2 and 3 (Examples of Active Type Pixel Circuit)
Modification 4 (Another Example of Line-Sequential Image Pickup Driving)
Modifications 5 and 6 (Other Examples of Configuration of Column Selection Section)
Modifications 7 and 8 (Examples of Image Pickup Section Picking up Image Based on Radiation)
3. Application Example (Application Example to Image Pickup Display System)
4. Other Modifications
[Embodiment]
[General Configuration of Image Pickup Unit 1]

Figure 1:
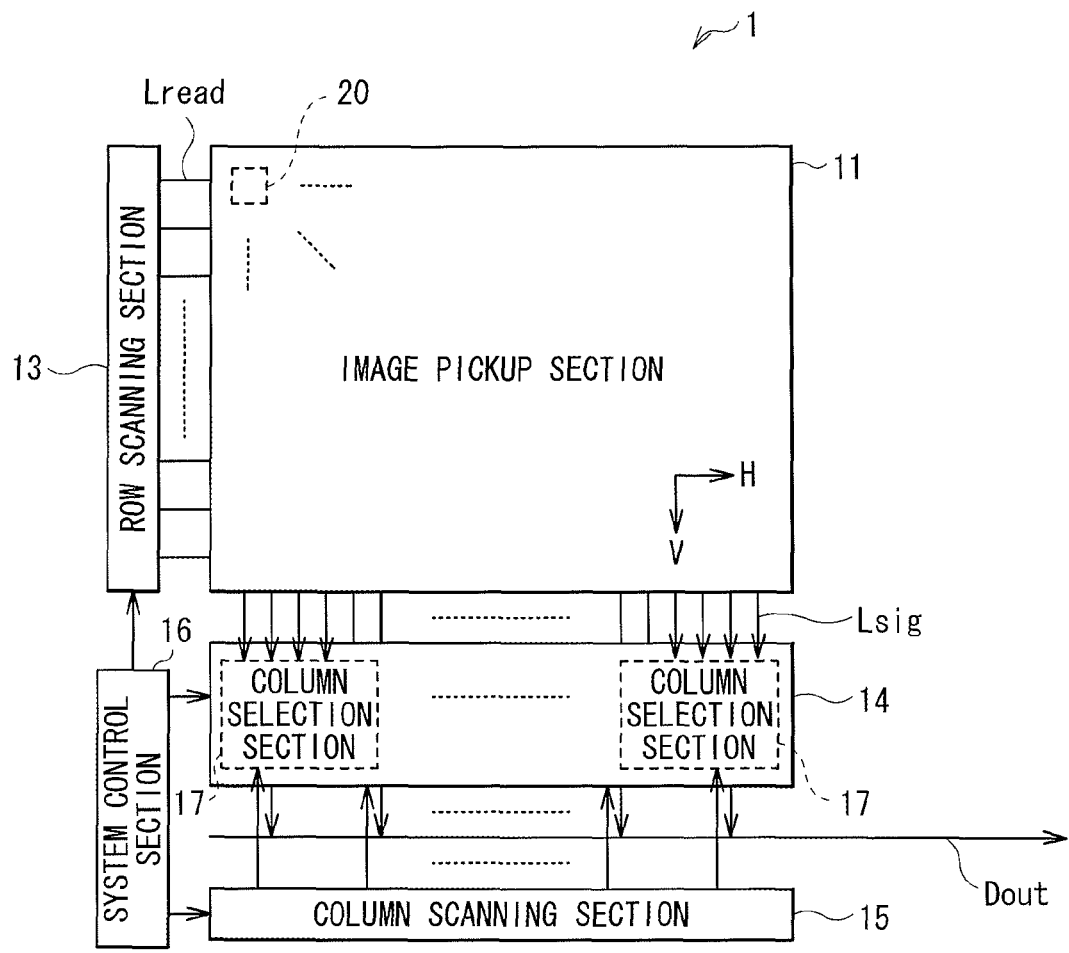
FIG. 1 is a block diagram showing an example of a general configuration of an image pickup unit according to an embodiment of the present disclosure.

FIG. 1 shows a general block configuration of an image pickup unit (an image pickup unit 1) according to an embodiment of the present disclosure. The image pickup unit 1 reads information of a subject (or picks up an image of a subject) based on image-pickup light. The image pickup unit 1 includes an image pickup section 11, a row scanning section 13, an A/D conversion section 14, a column scanning section 15, and a system control section 16. Among them, the row scanning section 13, the A/D conversion section 14, the column scanning section 15, and the system control section 16 correspond to a specific example of "driving section" of the present disclosure.

[Image Pickup Section 11]

The image pickup section 11 is a section (an image pickup region) that generates an electric signal in response to inputted image-pickup light. In the image pickup section 11, pixels (image pickup pixels or unit pixels) 20 each including a photoelectric conversion section (a photoelectric conversion device 21 described later) that generates and stores therein photocharge having electric charge amount corresponding to the amount of the inputted image-pickup light are two-dimensionally disposed in rows and columns (in a matrix). It should be noted that, as illustrated in FIG. 1, in the following description, the horizontal direction (row direction) and the vertical direction (column direction) in the image pickup section 11 are referred to as "H" direction and "V" direction, respectively.

Figure 2:
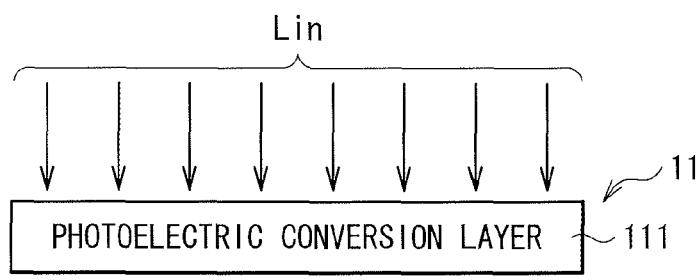
FIG. 2 is a schematic view showing an example of a schematic configuration of an image pickup section illustrated in FIG. 1.

FIG. 2 shows an example of a schematic configuration of the image pickup section 11. The image pickup section 11 is provided with a photoelectric conversion layer 111 in which the plurality of pixels 20 mentioned above are disposed. In the photoelectric conversion layer 111, as illustrated in the drawing, photoelectric conversion (conversion from image-pickup light Lin to signal electric charge) based on incident image-pickup light Lin is performed.

Figure 3:
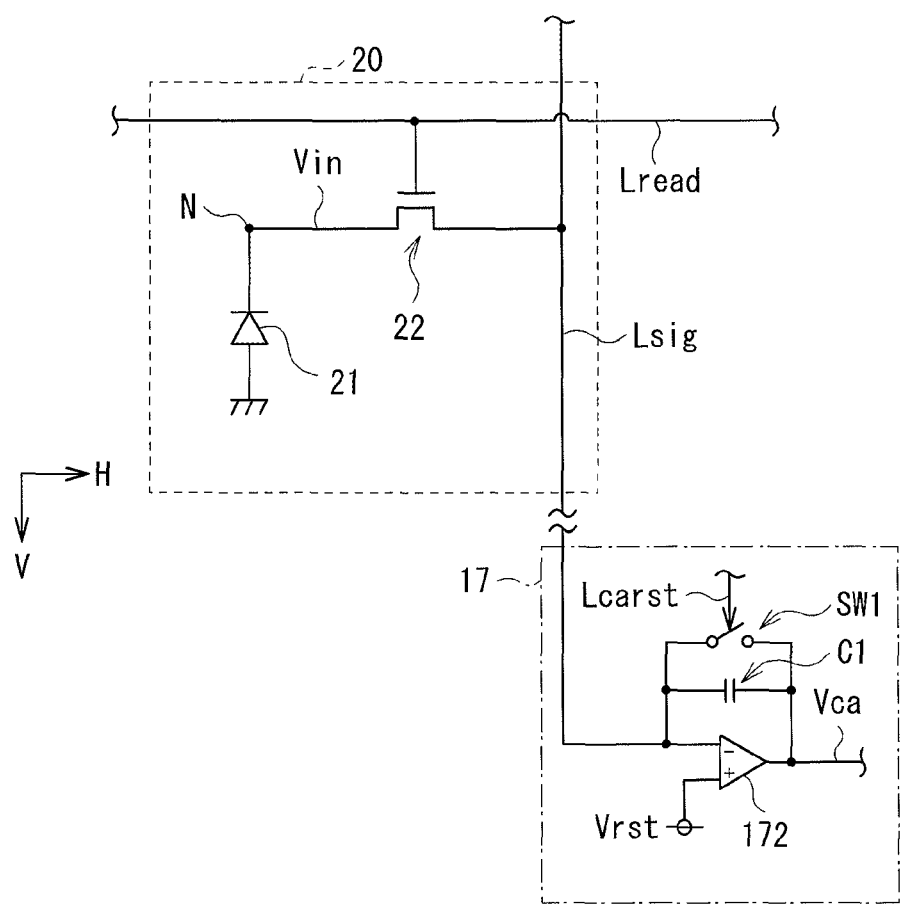
FIG. 3 is a circuit diagram showing an example of a specific configuration of a pixel and the like illustrated in FIG. 1.

FIG. 3 shows an example of a circuit configuration (an example of a configuration of a so-called passive circuit) of the pixel 20, together with an example of a circuit configuration of a column selection section 17 described later in the A/D conversion section 14. The passive type pixel 20 is provided with one photoelectric conversion device 21 and one transistor 22. Additionally, a read-out control line Lread extending along the H direction and a signal line Lsig extending along the V direction are connected to the pixel 20.

The photoelectric conversion device 21 is configured of, for example, a PIN (positive intrinsic negative) type photodiode, and, as described above, the photoelectric conversion device 21 generates signal electric charge having electric charge amount corresponding to the amount of incident light (image-pickup light Lin). It should be noted that a cathode of the photoelectric conversion device 21 is connected to a storage node N.

The transistor 22 is a transistor (readout transistor) which becomes an on state in response to a row scanning signal supplied through the readout control line Lread to thereby output a signal electric charge (input voltage Vin) obtained by the photoelectric conversion device 21 to the signal line Lsig. In this example, the transistor 22 is configured of an N-channel type (N-type) field effect transistor (FET). It is to be noted that the transistor 22 may be configured of a P-channel type (P-type) FET or the like. In addition, the transistor 22 is made of, for example, a silicon-based semiconductor such as microcrystalline silicon (Si) and multicrystalline silicon (poly silicon). Alternatively, the transistor 22 may be made of an oxide semiconductor such as indium gallium zinc oxide (InGaZnO) and zinc oxide (ZnO). Since microcrystalline silicon, multicrystalline silicon, and oxide semiconductor each have higher mobility μas compared with amorphous silicon, fast readout of signal electric charge by the transistor 22 is realized, for example.

In the pixel 20, a gate of the transistor 22 is connected to the readout control line Lread, a source thereof is connected to the signal line Lsig, and a drain thereof is connected to the cathode (the storage node N) of the photoelectric conversion device 21. An anode of the photoelectric conversion device 21 is connected to the ground (grounded).

[Row Scanning Section 13]

The row scanning section 13 illustrated in FIG. 1 is made up of a shift register circuit, an address decoder, a logic circuit, and the like not shown in the drawing, for example, and is a pixel driving section (row scanning circuit) that performs driving (line-sequential scanning) of the pixels 20 in the image pickup section 11 on a row-by-row basis (in horizontal line units). Specifically, the row scanning section 13 performs such a line-sequential scanning at the time of line-sequential image pickup driving such as line-sequential readout driving and line-sequential reset driving described later. It should be noted that the line-sequential scanning is performed by supplying the above-described row scanning signal to each pixel 20 through the readout control line Lread.

[A/D Conversion Section 14]

As illustrated in FIG. 1, the A/D conversion section 14 includes a plurality of the column selection sections 17 each of which is provided for each group of the signal lines Lsig (four signal lines Lsig, in this case), and performs A/D conversion (analog-digital conversion) based on a signal voltage (signal electric charge) inputted through the signal line Lsig. With this, output data Dout in the form of a digital signal (image pickup signal) is generated, and outputted to the outside.

Figure 4:
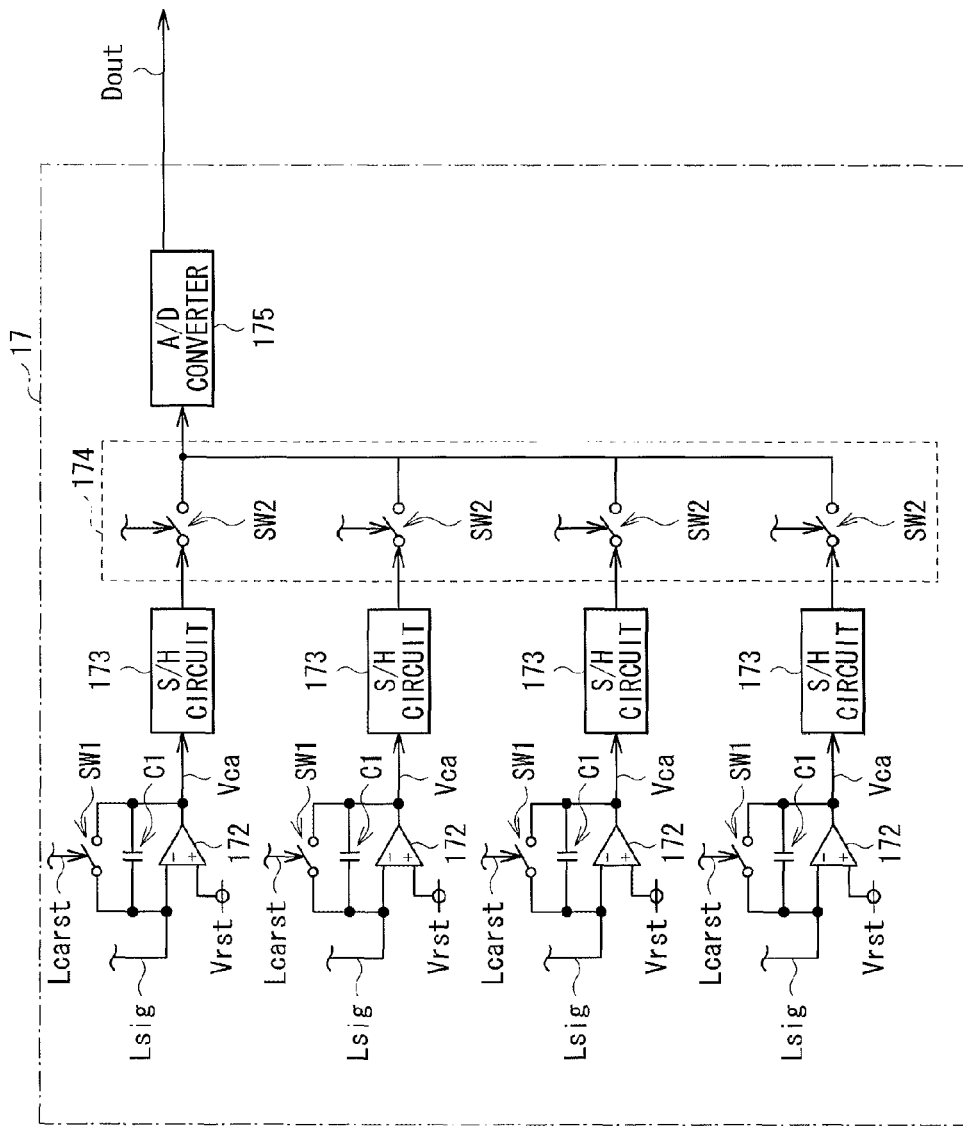
FIG. 4 is a block diagram showing an example of a specific configuration of a column selection section illustrated in FIG. 1.

Each of the column selection sections 17 includes, as illustrated in FIG. 3 and FIG. 4 for example, charge amplifiers 172, capacitive devices (capacitors, or feedback capacitive devices) C1, switches SW1, sample and hold (S/H) circuits 173, a multiplexer circuit (a selection circuit) 174 including four switches SW2, and an A/D converter 175. Among them, each of the charge amplifier 172, the capacitive device C1, the switch SW1, the S/H circuit 173, and the switch SW2 is provided for each signal line Lsig as illustrated in FIG. 4. On the other hand, each of the multiplexer circuit 174 and the A/D converter 175 are provided to each column selection section 17.

The charge amplifier 172 is an amplifier configured to convert (Q-V conversion) signal electric charge read out from the signal line Lsig to voltage. One end of the signal line Lsig is connected to an input terminal on a negative side (− side) of the charge amplifier 172, and a predetermined reset voltage Vrst is inputted to an input terminal on a positive side (+ side) of the charge amplifier 172. In addition, a feedback connection is established between the output terminal and the input terminal on the negative side of the charge amplifier 172 through a parallel circuit of the capacitive device C1 and the switch SW1. In other words, one terminal of the capacitive device C1 is connected to the input terminal on the negative side of the charge amplifier 172, and the other terminal of the capacitive device C1 is connected to the output terminal of the charge amplifier 172. Likewise, one terminal of the switch SW1 is connected to the input terminal on the negative side of the charge amplifier 172, and the other terminal of the switch SW1 is connected to the output terminal of the charge amplifier 172. It should be noted that the on/off state of the switch SW1 is controlled by a control signal (amplifier reset control signal) supplied from the system control section 16 through an amplifier reset control line Lcarst. Thus, with the charge amplifier 172, the capacitive device C1, and the switch SW1, a charge amplifier circuit that performs the above-mentioned Q-V conversion is formed.

The S/H circuit 173 is disposed between the charge amplifier 172 and the multiplexer circuit 174 (the switch SW2), and is configured to temporarily hold an output voltage Vca from the charge amplifier 172.

The multiplexer circuit 174 is a circuit that selectively connects or disconnects the S/H circuit 173 and the A/D converter 175 when one of the four switches SW2 sequentially becomes an on state according to the scan drive by the column scanning section 15. This makes it possible to select a part of a signal read out with use of the charge amplifier 172 (charge amplifier circuit).

The A/D converter 175 is a circuit that performs A/D conversion on an output voltage (a signal selected by the multiplexer circuit 174) inputted thereto from the S/H circuit 173 through the switch SW2 to generate the above-mentioned output data Dout, and outputs the output data Dout.

[Column Scanning Section 15 and System Control Section 16]

The column scanning section 15 includes a shift register, an address decoder, and the like not shown in the drawing, and scans the switches SW2 in the above-mentioned column selection section 17 while sequentially driving the switches SW2. With such a selective scan by the column scanning section 15, the signal of each pixel 20 (the above-mentioned output data Dout) read out through each signal line Lsig is sequentially outputted to the outside.

The system control section 16 controls the operation of the row scanning section 13, the A/D conversion section 14, and the column scanning section 15. Specifically, the system control section 16 includes a timing generator configured to generate the above-described various kinds of timing signals (control signals), and controls the driving of the row scanning section 13, the A/D conversion section 14, and the column scanning section 15 based on the various kinds of timing signals generated by the timing generator. In this manner, based on the control of the system control section 16, each of the row scanning section 13, the A/D conversion section 14, and the column scanning section 15 performs image pickup driving (line-sequential image pickup driving) of the pixels 20 in the image pickup section 11, thereby obtaining the output data Dout from the image pickup section 11.

[Function and Effect of Image Pickup Unit 1]

[1. Basic Operation]

In the image pickup unit 1, as illustrated in FIG. 2, when image-pickup light Lin enters the image pickup section 11 during an exposure period Tex described later, the image-pickup light Lin is converted into signal electric charge (photoelectric conversion) in the photoelectric conversion layer 111 (the photoelectric conversion device 21 in each pixel 20 illustrated in FIG. 3). With the signal electric charge generated by this photoelectric conversion, variation in voltage according to a storage node capacitance is caused in the storage node N. Specifically, the voltage is reduced by (q/Cs) in the storage node N, where the storage node capacitance is Cs and the generated signal electric charge is q. In response to this variation in voltage, the input voltage Vin (the voltage corresponding to the signal electric charge) is applied to the drain of the transistor 22. When the transistor 22 becomes an on state in response to the row scanning signal supplied through the readout control line Lread, the electric charge of the input voltage Vin supplied to the transistor 22 is read out from the pixel 20 to the signal line Lsig (readout period).

The signal electric charge thus read out is inputted to the column selection section 17 in the A/D conversion section 14 through the signal line Lsig for each group of pixel columns (group of four pixel columns, in this case). In the column selection section 17, first, Q-V conversion (conversion from signal electric charge to signal voltage) is performed for each signal electric charge inputted through the signal lines Lsig in the charge amplifier circuit made up of the charge amplifier 172 and the like. Next, A/D conversion is performed for each signal voltage thus converted (output voltage Vca from the charge amplifier circuit) in the A/D converter 175 through the S/H circuit 173 and the multiplexer circuit 174, thereby generating the output data Dout (image pickup signal) in the form of a digital signal. In this manner, the output data Dout is sequentially outputted from each of the column selection sections 17, and transmitted to the outside.

[2. Operation in Exposure Period Tex and Readout Period]

Here, referring to FIGS. 5A and 5B, the operation of the pixel 20 and the charge amplifier circuit in the column selection section 17 during the above-mentioned exposure period Tex and the readout period will be described in detail. It should be noted that, in the following description, the on/off state of the transistor 22 is illustrated with use of switches for convenience of description.

Figure 5A:
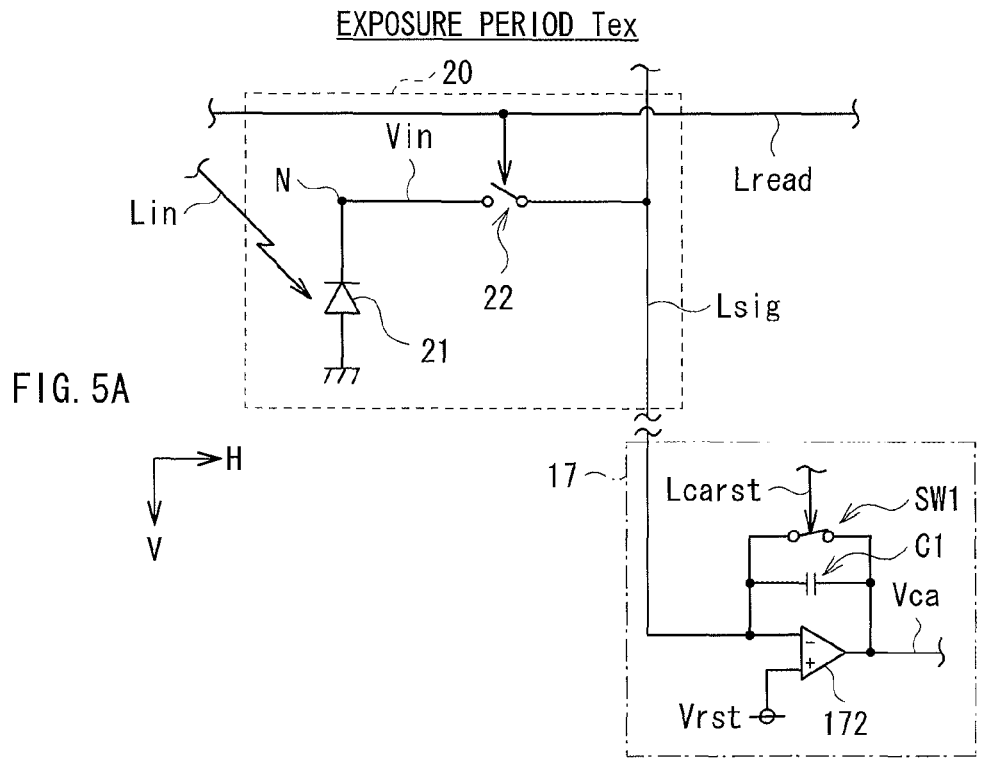
FIGS. 5A and 5B are circuit diagrams showing an example of an operating state in an exposure period and an example of an operating state in a readout/first reset period, respectively.

First, as illustrated in FIG. 5A, during the exposure period Tex during which image-pickup light Lin enters the photoelectric conversion device 21 in the pixel 20, the transistor 22 is in an off state so as to prevent the signal electric charge stored in the storage node N from being outputted (read out) to the signal line Lsig side. It should be noted that, at this time, since the charge amplifier circuit is in a state where an amplifier reset operation (reset operation of the charge amplifier circuit) described later has already been performed, the switch SW1 is in an on state, and consequently, a voltage follower circuit has been formed.

On the other hand, in the present embodiment, the above-mentioned readout period is also a period during which a reset operation (pixel reset operation) intended to reset the electric charge (signal electric charge) stored in the pixel 20. Specifically, due to the fact that the pixel 20 of the present embodiment is a passive type pixel circuit, "read out operation" intended to read out electric charge obtained by the photoelectric conversion device 21, as a signal, from the pixel 20, and the above-mentioned "pixel reset operation" are performed at substantially the same time (in parallel). In other words, although details are described later, line-sequential readout driving intended to perform the read out operation in a line-sequential manner, and line-sequential reset driving intended to perform a pixel reset operation in a line-sequential manner are performed at (substantially) the same time by single line-sequential driving. It should be noted that, since the pixel reset operation at this time corresponds to a first pixel reset operation of multiple (two times, in this case) pixel reset operations described later, the period during which the read out operation and the first pixel reset operation are performed at substantially the same time is referred to as "readout/first reset period Tr1" in the following description.

Figure 5B:
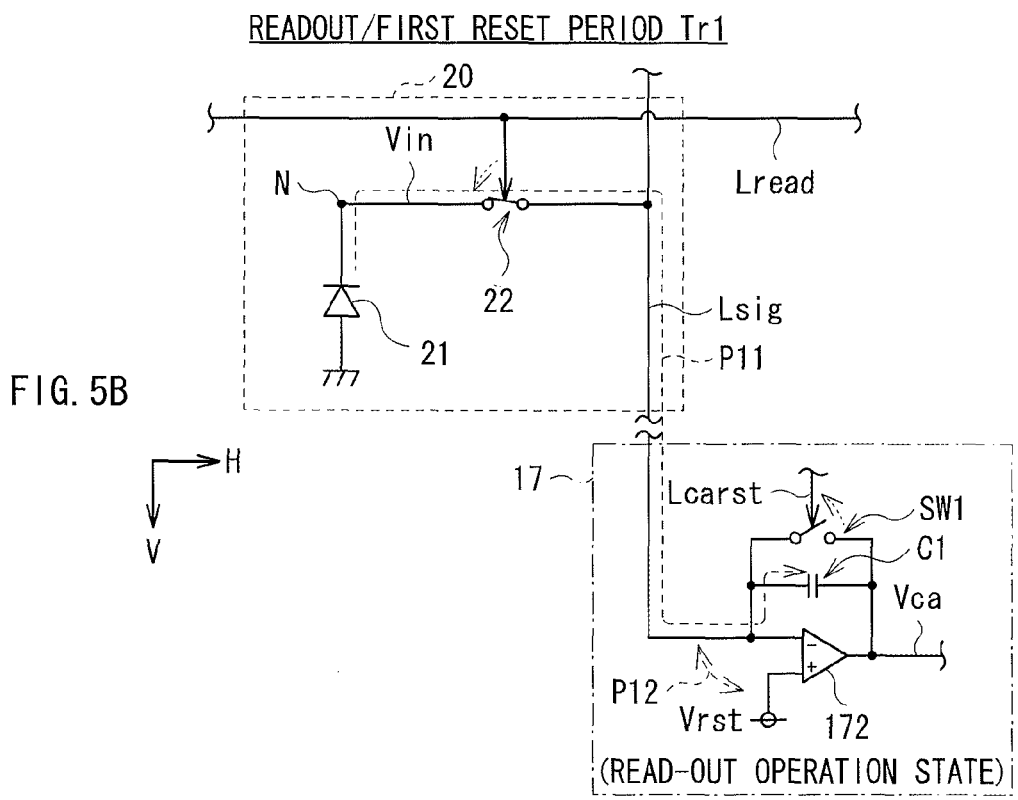

During the readout/first reset period Tr1, as illustrated in FIG. 5B, with the transistor 22 being in an on state, signal electric charge is read out from the storage node N in the pixel 20 to the signal line Lsig side (see an arrow P11 in the drawing). The signal electric charge thus read out is inputted to the charge amplifier circuit. During the readout/first reset period Tr1, the switch SW1 in the charge amplifier circuit is in an off state. In other words, the charge amplifier circuit is in a read-out operation state. Therefore, the signal electric charge inputted to the charge amplifier circuit is stored in the capacitive device C1, and a signal voltage (output voltage Vca) corresponding to the stored charge is outputted from the charge amplifier 172. In this manner, the conversion from signal electric charge to signal voltage (Q-V conversion) is performed in the charge amplifier circuit. It should be noted that, when the switch SW1 becomes an on state during an amplifier reset operation described later, the electric charge thus stored in the capacitive device C1 is reset (the amplifier reset operation is performed).

In addition, together with the read out operation, the first pixel reset operation is performed during the readout/first reset period Tr1, as described below. Specifically, as illustrated by an arrow P12 in the drawing, by utilizing an imaginary short phenomenon in the charge amplifier circuit (the charge amplifier 172), the first pixel reset operation is performed. In other words, with this imaginary short phenomenon, the voltage on the input terminal side (the signal line Lsig side) on the negative side of the charge amplifier 172 becomes substantially equal to the reset voltage Vrst applied to the input terminal on the positive side of the charge amplifier 172, and consequently, the voltage of the storage node N in the pixel 20 also becomes the reset voltage Vrst through the transistor 22. In this manner, along with the above-mentioned read out operation, the stored charge of the storage node N is reset to a predetermined reset voltage Vrst.

[3. Effect of Decreasing Residual Electric Charge Utilizing Multiple Pixel Reset Operations]

Incidentally, even when the above-mentioned first pixel reset operation has been performed, a part of the signal electric charge stored before the first pixel reset operation occasionally remains in the pixel 20. If a part of the signal electric charge remains in the pixel 20 in this manner, an after-image due to the residual electric charge may occur at the time of the next read out operation (at the time of image pickup during the next frame period), thereby deteriorating the quality of the picked-up image.

Figure 6:
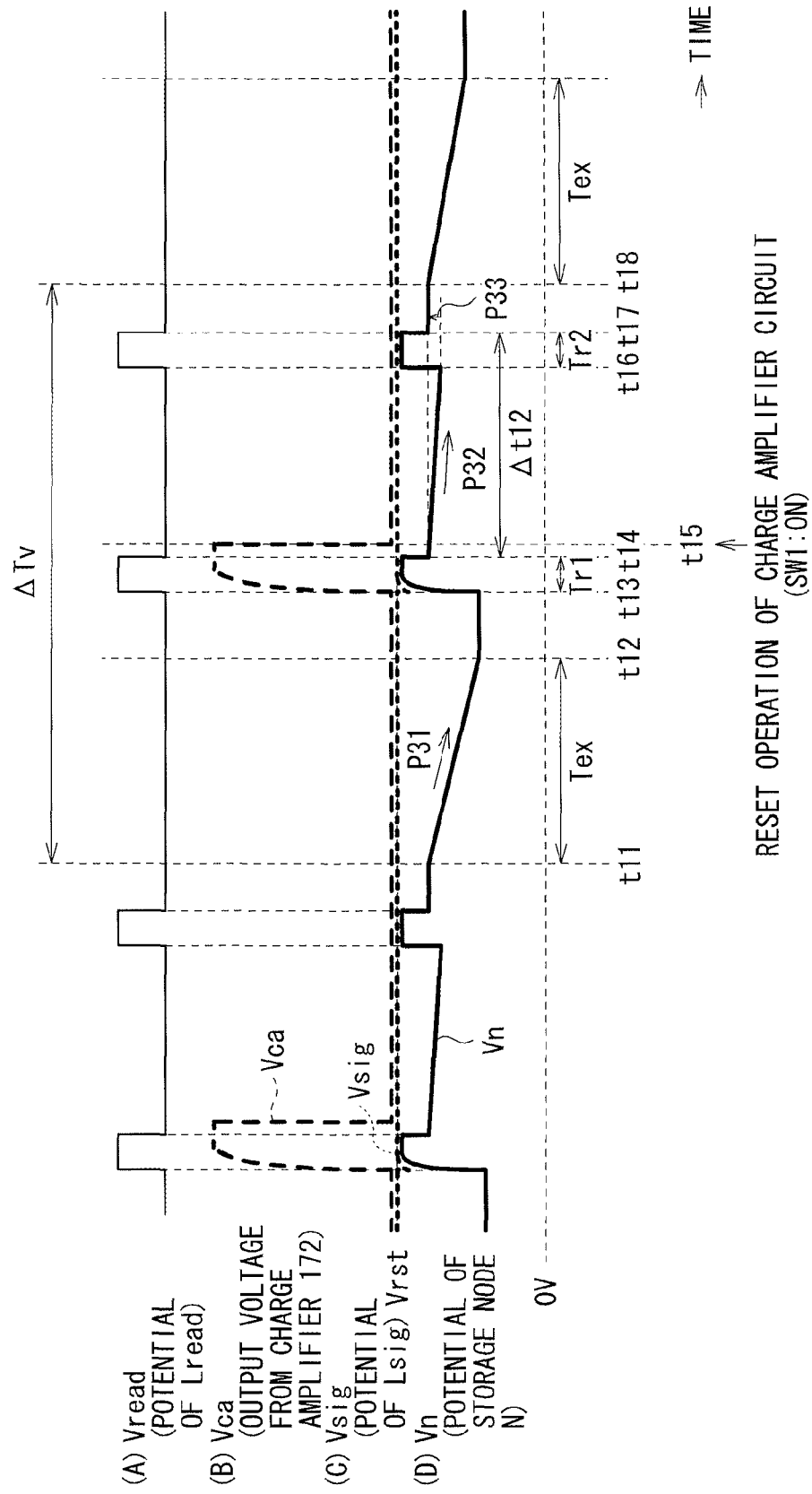
FIG. 6 is a timing waveform diagram for describing an outline of an image pickup operation.
Figure 7:
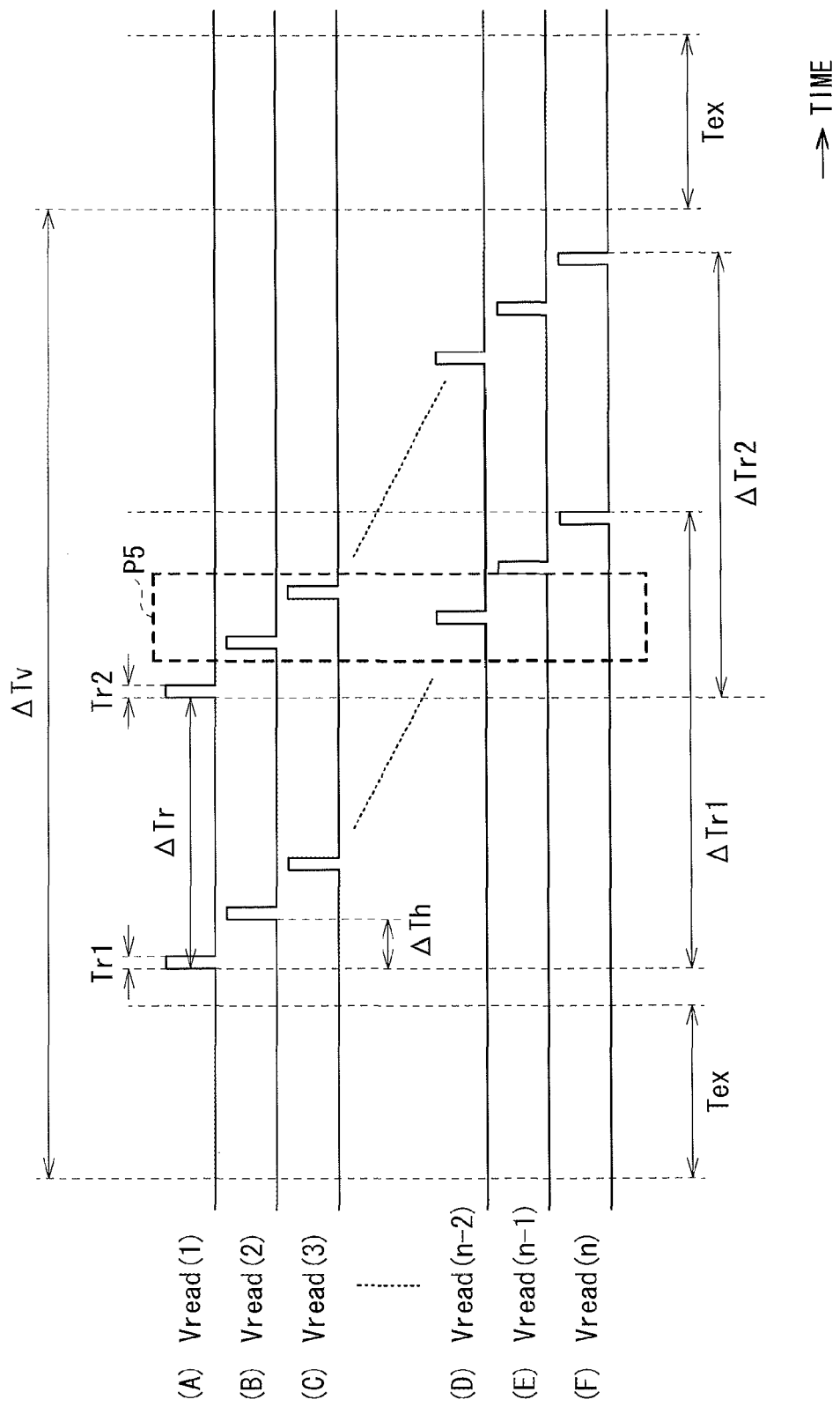
FIG. 7 is a timing waveform diagram showing an example of line-sequential image pickup driving.

In the present embodiment, as illustrated in FIG. 6 and FIG. 7 for example, multiple (two times, in this case) pixel reset operations are performed to decrease the above-mentioned residual electric charge, thereby suppressing an after-image due to the residual electric charge. Below, an effect of decreasing the residual electric charge utilizing the multiple pixel reset operations will be described in detail.

(A) of FIG. 6 illustrates a timing waveform of a potential Vread of the readout control line Lread, (B) of FIG. 6 illustrates a timing waveform of an output voltage Vca from the charge amplifier 172, (C) of FIG. 6 illustrates a timing waveform of a potential Vsig of the signal line Lsig, and (D) of FIG. 6 illustrates a timing waveform of a potential Vn at the storage node N. In addition, the timing waveforms each correspond to a period including one vertical period (one frame period) ΔTv and the periods immediately preceding and following the one vertical period ΔTv.

In addition, FIG. 7 is a timing waveform diagram showing an example of line-sequential image pickup driving (line-sequential readout driving and line-sequential reset driving) according to the present embodiment. (A) to (F) of FIG. 7 respectively illustrate timing waveforms of potential Vread (1) to Vread(3) and Vread(n−2) to Vread(n) of n readout control lines, Lread(1) to Lread(3) and Lread(n−2) to Lread (n). In addition, ΔTh illustrated in the drawing represents one horizontal period (one horizontal scan period). Further, ΔTr1 represents a line-sequential drive period pertaining to the first pixel reset operation and the like (the operation of the first read out/reset period Tr1), and ΔTr2 represents a line-sequential drive period pertaining to a second pixel reset operation and the like (the operation of the first read out/reset period Tr1).

During the one frame period ΔTv, an exposure operation is performed in the exposure period Tex from timing t11 to timing t12, as described above using FIG. 5A and the like. Specifically, when the image-pickup light Lin enters the image pickup section 11, the image-pickup light Lin is converted into signal electric charge (photoelectric conversion) in the photoelectric conversion device 21 in each pixel 20. Then, the signal electric charge is stored in the storage node N in the pixel 20, and the potential Vn is gradually varied (see an arrow P31 in FIG. 6). It should be noted that the reason that the potential Vn is gradually decreased from the reset voltage Vrst side to 0 V with the exposure operation is that the cathode of the photoelectric conversion device 21 is connected to the storage node N.

Next, during the readout/first reset period Tr1 from timing t13 to timing t14, the read out operation and the first pixel reset operation are performed, as described above using FIG. 5B and the like. Specifically, the read out operation intended to obtain an image pickup signal D11 corresponding to signal electric charge by reading out a signal electric charge from the pixel 20, and the first pixel reset operation intended to reset the signal electric charge in the pixel 20, are performed at substantially the same time. It is to be noted that, as illustrated by an arrow P32 in FIG. 6, after the first pixel reset operation, the potential Vn at the storage node N is gradually decreased, and the above-described residual electric charge q1 is generated.

It should be noted that, at the subsequent timing t15 for example, the switch SW1 in the charge amplifier circuit becomes an on state, and consequently the electric charge stored in the capacitive device C1 of the charge amplifier circuit is reset. In other words, the reset operation for the charge amplifier circuit (the amplifier reset operation) is performed.

Then, during the subsequent period from timing t16 to timing t17 (second reset period Tr2), the second pixel reset operation described below is performed.

Figure 8A:
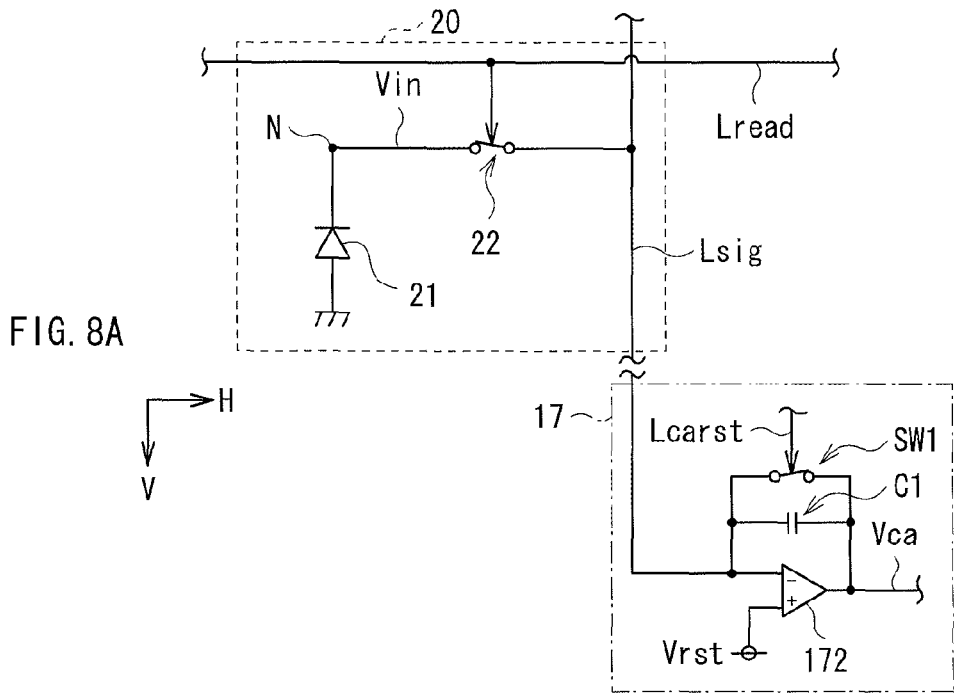
FIGS. 8A and 8B are circuit diagrams showing examples of operating states in a second reset period.

Specifically, during the second reset period Tr2, the second pixel reset operation is performed in such a manner as a first operation example illustrated in FIG. 8A, for example. To be more specific, in the first operation example, the transistor 22 in the pixel 20 becomes an on state, and the switch SW1 in the charge amplifier circuit also becomes an on state, thereby forming a voltage follower circuit using the charge amplifier 172. Consequently, due to a feedback property of the charge amplifier 172, a voltage at the input terminal (the signal line Lsig side) on the negative side of the charge amplifier 172 becomes substantially equal to the reset voltage Vrst which has been applied to the input terminal on the positive side of the charge amplifier 172. In this manner, in the first operation example, the potential Vn at the storage node N in the pixel 20 is set to the reset voltage Vrst by utilizing the feedback property of the charge amplifier 172 (or, the second pixel reset operation is performed).

Figure 8B:
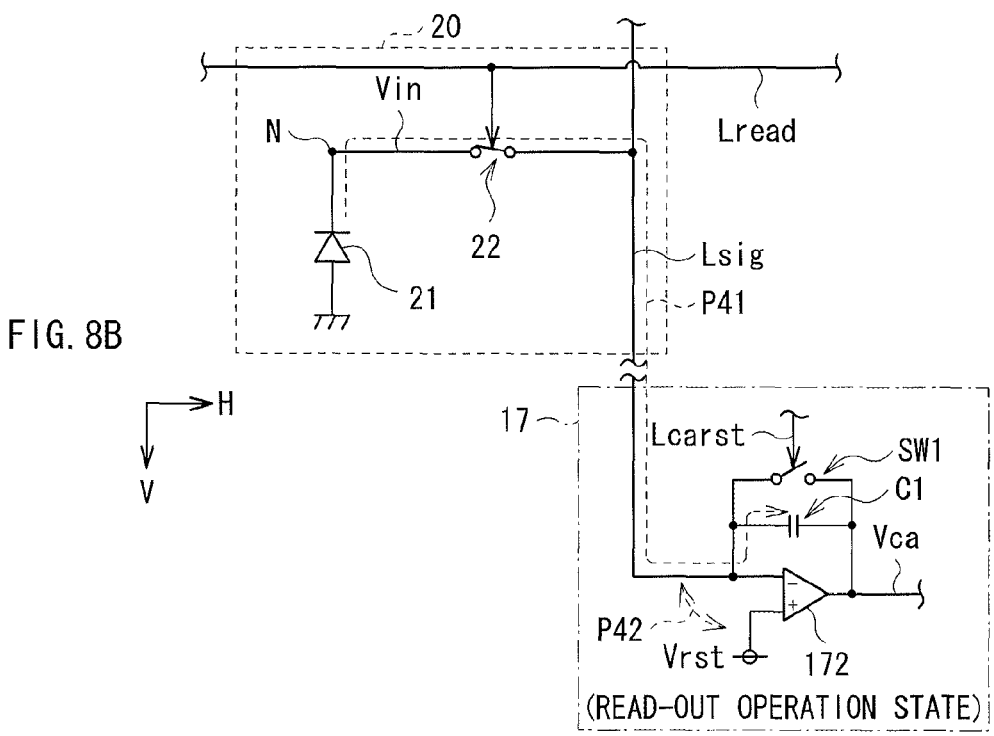

On the other hand, in a second operation example illustrated in FIG. 8B, the second pixel reset operation is performed (see an arrow P42 in the drawing) by utilizing the imaginary short phenomenon of the charge amplifier circuit (the charge amplifier 172) as with the above-described first pixel reset operation. In other words, by the imaginary short phenomenon, the potential Vn at the storage node N in the pixel 20 is set to the reset voltage Vrst. It should be noted that, at this time, since the transistor 22 in the pixel 20 is in an on state while the switch SW1 in the charge amplifier circuit is in an off state, the charge amplifier circuit is in a read-out operation state as with the case of the readout/first reset period Tr1. In other words, in the second operation example, it is also possible to read out the electric charge remaining at the storage node N by the charge amplifier circuit, as illustrated by an arrow P41 in the drawing.

In this manner, the pixel reset operation for the charge stored in the pixel 20 (line-sequential reset driving described later) is intermittently (independently) performed multiple times in one frame period in the present embodiment. Specifically, the first pixel reset operation (the readout/first reset period Tr1) and the second pixel reset operation (the second reset period Tr2) are intermittently performed in this case. With this, residual electric charge existing in the pixel 20 (the amount of remaining signal electric charge) after the first pixel reset operation is more securely reset, and thus such residual electric charge is decreased (see an arrow P33 illustrated in FIG. 6).

It should be noted that, preferably, the multiple pixel reset operations (the line-sequential reset driving) is intermittently performed over a period longer than one horizontal period (e.g., one horizontal scanning period: about 32 μs) for example. One reason for this is as follows. Specifically, for example, state transition in a PIN photodiode takes about several hundred milliseconds. Accordingly, the occurrence of the residual electric charge may conceivably be decreased by continuously or intermittently applying the reset voltage Vrst to the storage node N over about 100 μs, for example. In practice, however, it has been confirmed by experiment and the like that, when the period during which the reset voltage Vrst is applied exceeds one horizontal period (e.g., about 32 μs), the residual electric charge starts to decrease considerably.

[4 Timing and the Like of Reset Operations]

In addition, in the present embodiment, the timing and the period of the reset operations (the pixel reset operation and the amplifier reset operation) at the time of the line-sequential image pickup driving (the line-sequential readout driving and the line-sequential reset driving) are set as illustrated in the following FIG. 9 to FIG. 16, for example.

Figure 9:
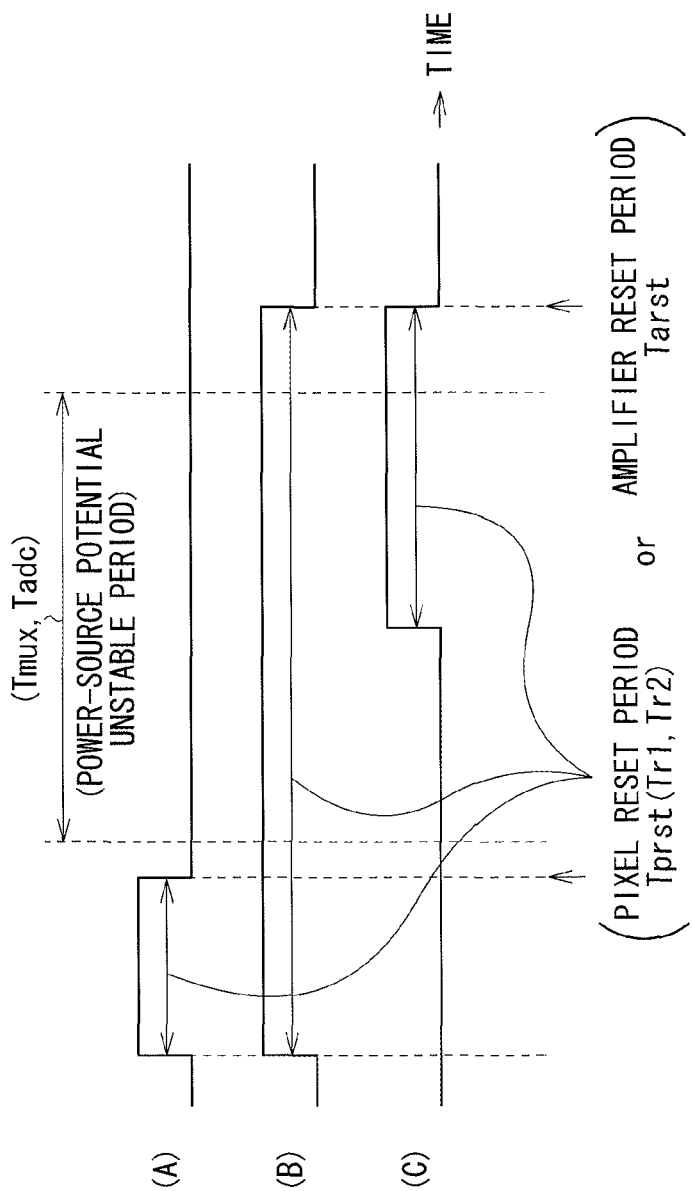
FIG. 9 is a timing waveform diagram showing an example of a relationship between a pixel reset period, an amplifier reset period, and a power-source potential unstable period according to the embodiment.

Specifically, as illustrated in (A) to (C) of FIG. 9 for example, the timing and the period of the reset operations are set such that one of the end timing of the pixel reset period Tprst and the end timing of the amplifier reset period Tarst is not included in a predetermined power-source potential unstable period (see an arrow in the drawing). Alternatively, as illustrated in (A) to (C) of FIG. 10 for example, the timing and the period of the reset operations are set such that both the end timing of the pixel reset period Tprst and the end timing of the amplifier reset period Tarst are not included in a predetermined power-source potential unstable period (see an arrow in the drawing). In particular, as illustrated in (A) of FIG. 9 and (A) of FIG. 10, it is desirable that the entire pixel reset period Tprst (the entire period of the pixel reset operation) or the entire amplifier reset period Tarst (the entire period of the amplifier reset operation) be not included in the power-source potential unstable period.

In this example, the pixel reset period Tprst refers to both the readout/first reset period Tr1 and the second reset period Tr2. In addition, "power-source potential unstable period" in this example is a period during which the power-source potential including the ground potential is fluctuated (or, the power-source potential including the ground potential is unstable). Specifically, as illustrated in FIG. 9 for example, the power-source potential unstable period includes a multiplexer operation period Tmux (the operation period of the multiplexer circuit 174), an A/D conversion period Tadc (the operation period of the A/D converter 175), and the like (one or both of the two operation periods are included).

In this example, one reason that the end timing of the pixel reset period Tprst and the end timing of the amplifier reset period Tarst are excluded from (or not included in) the above-mentioned power-source potential unstable period is in order to reduce a noise component in an image pickup signal (output data Dout) due to destabilization of the reset voltage Vrst and the like. In the following, an issue concerning the noise component will be specifically described.

First, as illustrated in FIG. 4 for example, since a number of the switches SW2 are provided in the multiplexer circuit 174, noise (switching noise) tends to be superimposed on the power source (grounded power source or the like) when the switches SW2 are turned on or off. In addition, generally, circuits for digital signal tend to be a noise source. One reason for this is that, since a digital signal is obtained through quick switching between two voltage levels (high level and low level), high-frequency noise occurs at the time of the switching between the two voltage levels. Such high-frequency noise is mainly superimposed on a digital power source (grounded power source and the like), and even if the digital power source is designed to be separated from an analog power source, the noise exerts some influence. In particular, the high-frequency noise has a large influence on A/D converters because an analog system and a digital system generally exist close to each other in typical A/D converters.

As described above, the power source is fluctuated (or the power-source potential is unstable) during the multiplexer operation period Tmux and the A/D conversion period Tadc. Therefore, if the end timing of the pixel reset period Tprst and the end timing of the amplifier reset period Tarst are included in the multiplexer operation period Tmux and the A/D conversion period Tadc, the following issue of noise is raised.

Specifically, first, when the reset voltage Vrst is fluctuated due to the fact that the power-source potential is in an unstable state, the potential Vsig of the signal line Lsig is also fluctuated due to the above-described imaginary short phenomenon in the charge amplifier circuit. If the pixel reset operation (the pixel reset period Tprst) is performed in this state, the electric charge in the pixel 20 is reset by the fluctuated reset voltage Vrst. In this case, if the pixel reset period Tprst is ended in the state where the reset voltage Vrst is fluctuated, the transistor 22 in the pixel 20 becomes an off state in an unstable voltage state, and as a result, the potential (and the grounded potential) of the storage node N is varied for each pixel reset operation. In other words, the potential at the anode of the photoelectric conversion device 21 and the cathode of the photoelectric conversion device 21 are varied. This results in a noise component of an image pickup signal, and deterioration in S/N ratio.

In addition, during the amplifier reset operation (the amplifier reset period Tarst), the voltage at the input terminal on the positive side of the charge amplifier 172 and the voltage at the input terminal on the negative side of the charge amplifier 172 are equal to each other for the above-described reason. However, if the reset voltage Vrst is fluctuated after the amplifier reset period Tarst, a potential difference occurs between the input terminal on the positive side and the input terminal on the negative side, and the output voltage Vca of the charge amplifier 172 varies. Since feedback occurs when the output voltage Vca of the charge amplifier 172 is varied in the above-mentioned manner, the voltage of the input terminal on the negative side is varied according to the capacitance ratio between the capacitance of the signal line Lsig and the capacitive device C1. As a result, electric charge is stored in the capacitive device C1 (a voltage is generated between the both ends of the capacitive device C1) even in the state where an image pickup signal is not read out from the pixel 20, and the stored electric charge results in a noise component of an image pickup signal.

Figure 10:
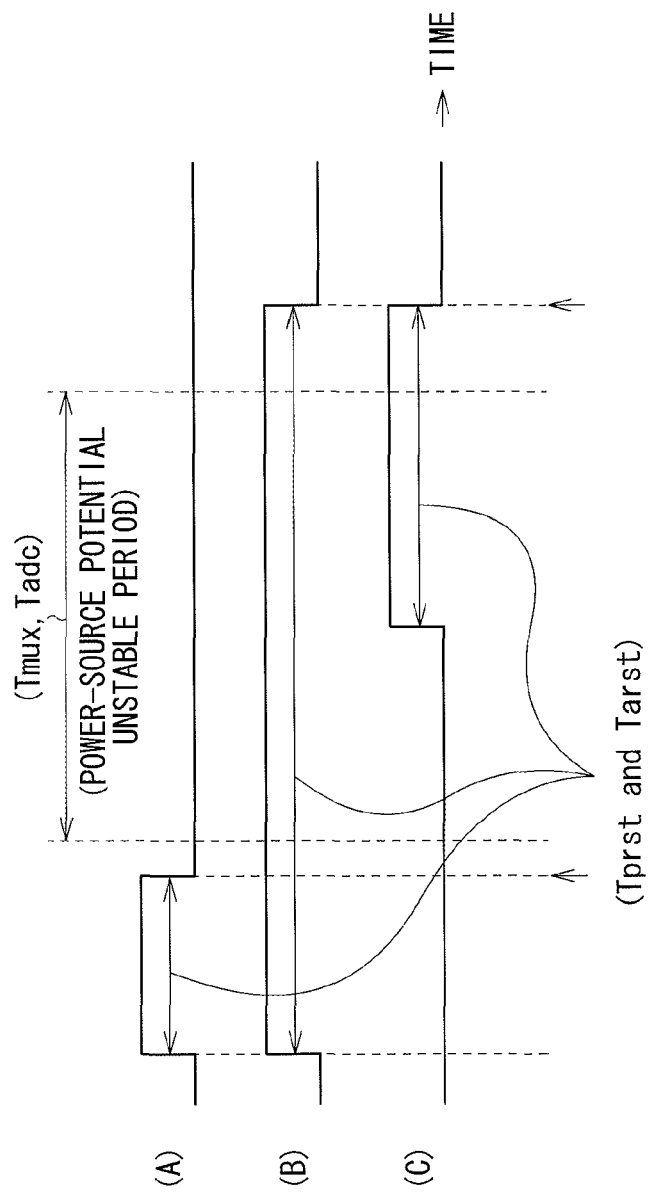
FIG. 10 is a timing waveform diagram showing another example of a relationship between the pixel reset period, the amplifier reset period, and the power-source potential unstable period according to the embodiment.
Figure 11:
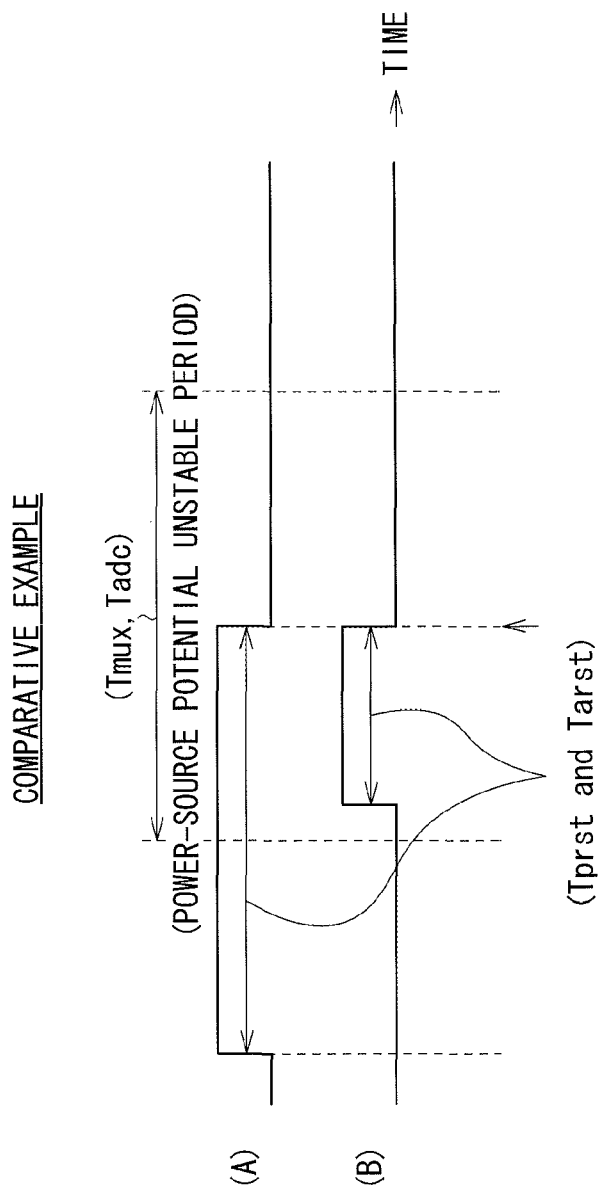
FIG. 11 is a timing waveform diagram showing a relationship between a pixel reset period, an amplifier reset period, and a power-source potential unstable period according to a comparative example.
Figure 12:
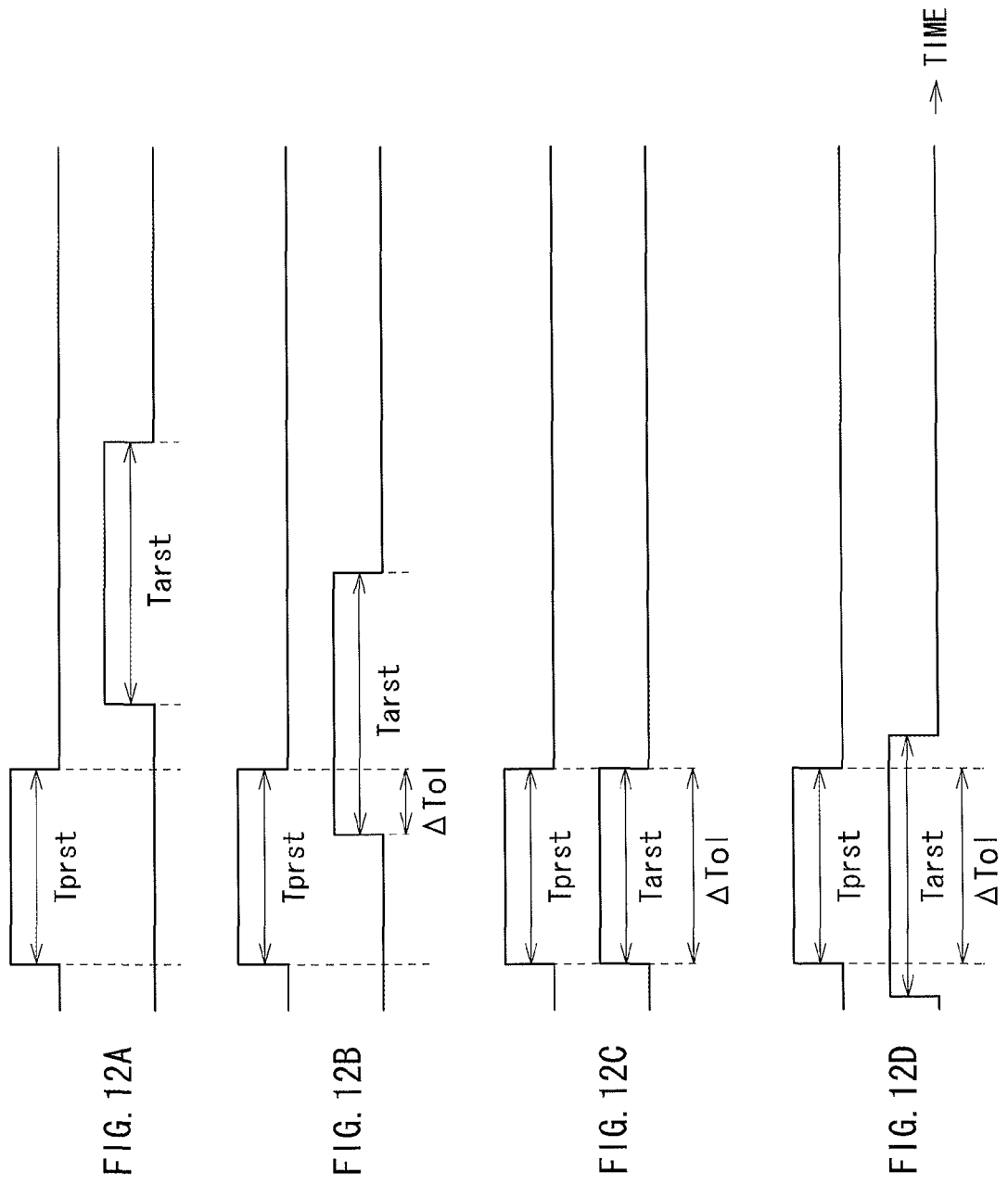
FIGS. 12A to 12D are timing waveform diagrams each showing an example of the relationship between the pixel reset period and the amplifier reset period according to the embodiment.

For the reasons described above, in the present embodiment, the pixels 20 are driven such that one or both of the end timing of the pixel reset period Tprst and the end timing of the amplifier reset period Tarst are not included in the above-mentioned power-source potential unstable period as illustrated in FIG. 9 and FIG. 10. Consequently, for example, as with a comparative example illustrated in (A) and (B) of FIG. 11, a noise component in an image pickup signal due to destabilization of the above-mentioned reset voltage Vrst is decreased as compared with the case where the end timing of the pixel reset period Tprst and the end timing of the amplifier reset period Tarst are included in the power-source potential unstable period.

In addition, in the present embodiment, as compared to the case where the pixel reset period Tprst and the amplifier reset period Tarst are not overlapped (superposed) with each other as illustrated in FIG. 12A for example, it is preferable that these periods be overlapped with each other at least in part as illustrated in FIGS. 12A to 12D, for example. Specifically, in the example illustrated in FIG. 12B, the pixel reset period Tprst and the amplifier reset period Tarst are overlapped in part with each other, thereby defining an overlapping period ΔTo1. In addition, in the example illustrated in FIG. 12C, the pixel reset period Tprst and the amplifier reset period Tarst are overlapped in whole with each other, thereby defining the overlapping period ΔTo1. In other words, the pixel reset period Tprst and the amplifier reset period Tarst coincide with each other. Further, in the example illustrated in FIG. 12D, the entire pixel reset period Tprst (the entire period from the start timing to the end timing) is included in the amplifier reset period Tarst, thereby providing the overlapping period ΔTo1. As described above, in the case where the pixel reset period Tprst and the amplifier reset period Tarst are overlapped at least in part with each other, it is possible to shorten the reset operation time, and decrease the above-mentioned noise component so as to improve S/N ratio while suppressing deterioration in frame rate as much as possible (or without deteriorating the frame rate).

Here, when timing waveforms in and around a period illustrated by reference symbol P5 in the above-described FIG. 7 are illustrated in an enlarged manner, the timing and the period of the reset operations (the pixel reset operation and the amplifier reset operation) are specifically illustrated as in FIG. 13 to FIG. 16, for example. It should be noted that, in each of FIGS. 13 to 16, the above-described potential Vcarst of the amplifier reset control line Lcarst in the case of the above-described first operation example ((D) of the drawings), and the above-described potential Vcarst of the amplifier reset control line Lcarst in the case of the above-described second operation example ((E) of the drawings) are illustrated.

Figure 13:
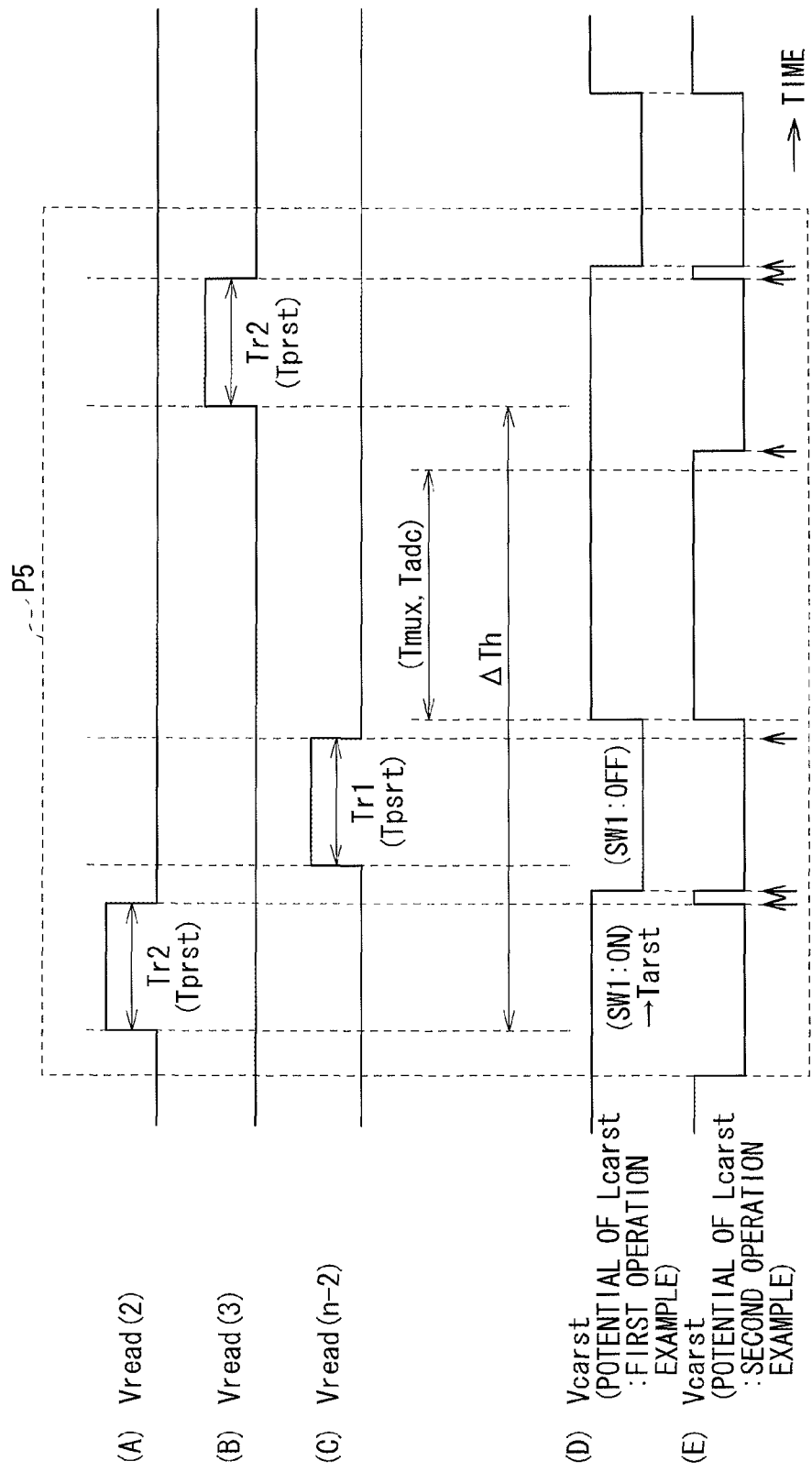
FIG. 13 is a timing waveform diagram showing a part of the line-sequential image pickup driving illustrated in FIG. 7 in an enlarged manner.
Figure 14:
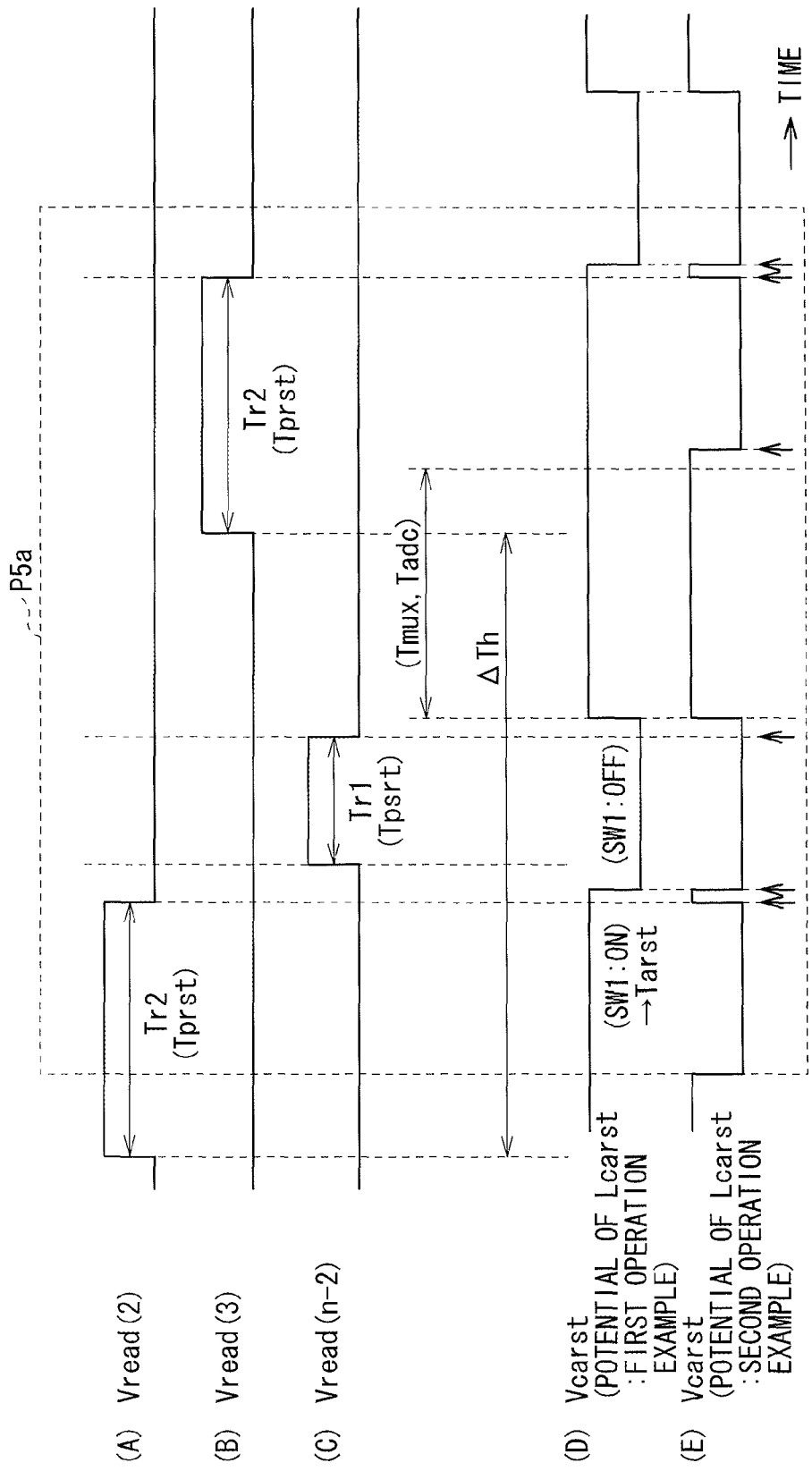
FIG. 14 is a timing waveform diagram showing another example of the line-sequential image pickup driving according to the embodiment.

First, in examples illustrated in FIG. 13 and FIG. 14, the periods illustrated by reference symbol P5 and reference symbol P5a are configured as follows. Specifically, a potential Vread corresponding to a row scanning signal is applied to Vread(2) (the second reset period Tr2), Vread(n−2) (the readout/first reset period Tr1), and Vread(3) (the second reset period Tr2) in this order. In addition, particularly in the example illustrated in FIG. 14, a part of the amplifier reset period Tarst (a period from the start timing to the middle of the amplifier reset period Tarst) overlaps with a part of the power-source potential unstable period (the multiplexer operation period Tmux, the A/D conversion period Tadc, and the like). Further, in these examples, the end timing of the pixel reset period Tprst and the end timing of the amplifier reset period Tarst are not included in the power-source potential unstable period as illustrated by an arrow in the drawings.

Figure 15:
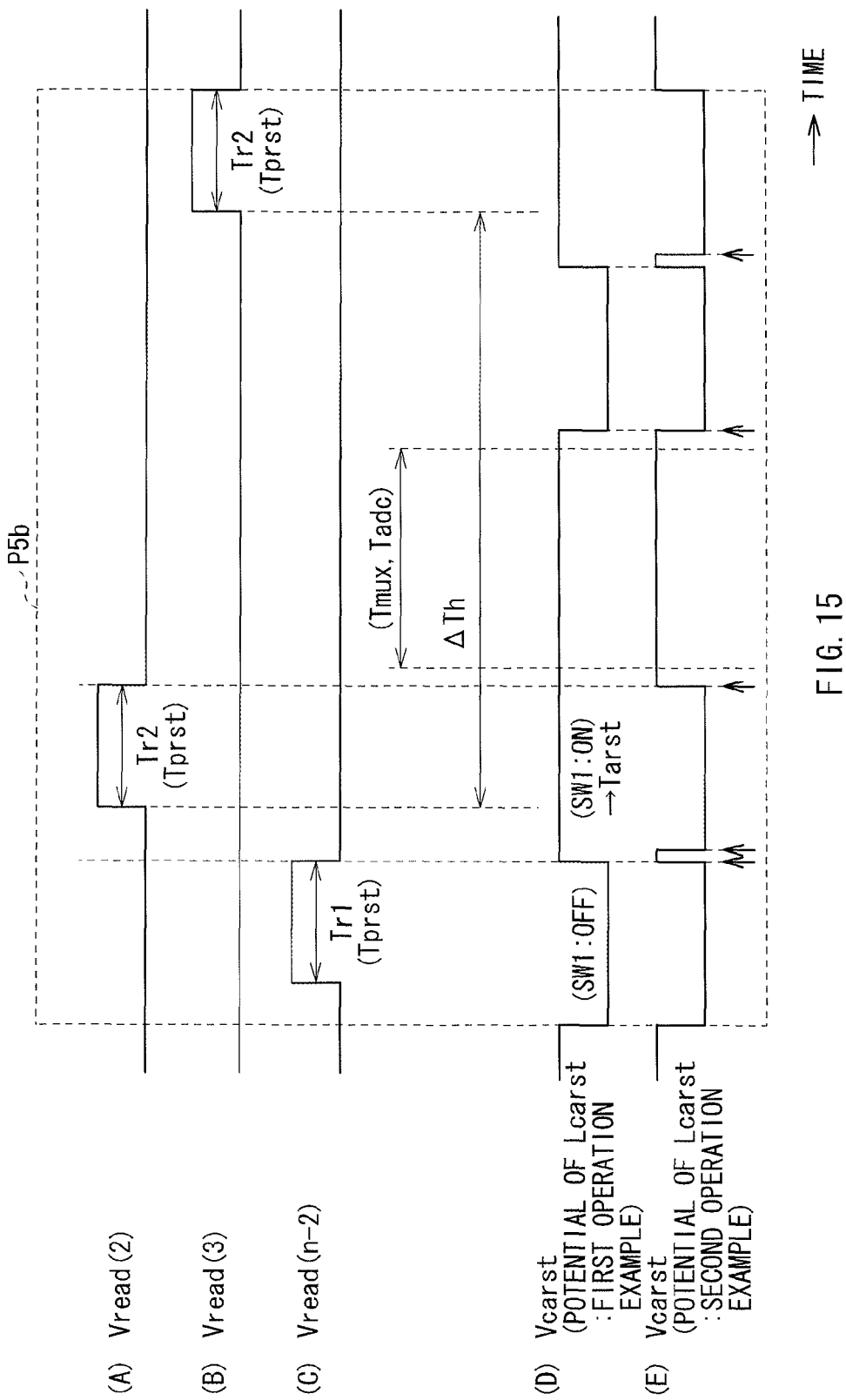
FIG. 15 is a timing waveform diagram showing still another example of the line-sequential image pickup driving according to the embodiment.
Figure 16:
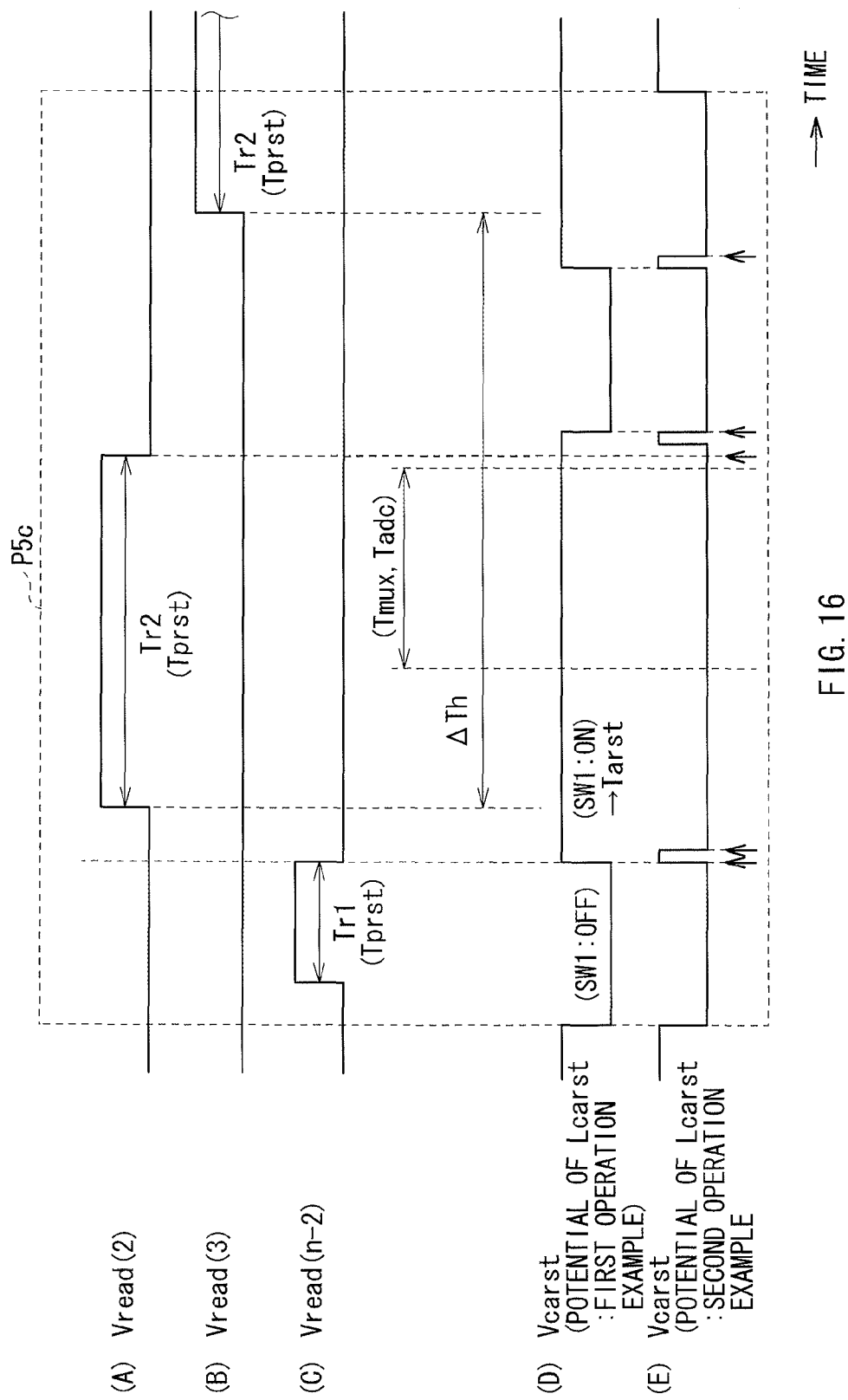
FIG. 16 is a timing waveform diagram showing still another example of the line-sequential image pickup driving according to the embodiment.

Unlike the periods illustrated by reference symbols P5 and P5a in FIG. 13 and FIG. 14, in examples illustrated in FIG. 15 and FIG. 16, during periods illustrated by reference symbol P5b and reference symbol P5c, the potential Vread corresponding to the row scanning signal is applied in the following order. That is, the potential Vread is applied to Vread(n−2) (the readout/first reset period Tr1), Vread(2) (the second reset period Tr2), and Vread(3) (the second reset period Tr2) in this order. In addition, particularly in the example illustrated in FIG. 16, a part of the amplifier reset period Tarst (middle period) overlaps with the power-source potential unstable period (the multiplexer operation period Tmux, the A/D conversion period Tadc, and the like). Further, in these examples, the end timing of the pixel reset period Tprst and the end timing of the amplifier reset period Tarst are not included in the power-source potential unstable period as illustrated by an arrow in the drawings.

As described above, in the present embodiment, each pixel 20 is driven such that each of the read out operation, the pixel reset operation, and the amplifier reset operation is performed, and that one or both of the end timing of the pixel reset operation (the pixel reset period Tprst) and the end timing of the amplifier reset operation (the amplifier reset period Tarst) are not included in the predetermined power-source potential unstable period. In this manner, it is possible to decrease a noise component in an image pickup signal (or it is possible to improve S/N ratio), and improve the quality of a picked-up image.

In particular, as compared with the case where the end timing of the amplifier reset period Tarst is not included in the power-source potential unstable period, when the end timing of the pixel reset period Tprst is not included in the power-source potential unstable period, S/N ratio is improved, and hence further improvement in the quality of a picked-up image is achieved, for the following reason. That is, one reason for this is that since a gain occurs when electric charge is read out from the pixel 20, the fluctuation of the reset voltage Vrst in the pixel 20 is increased, thereby influencing the output (or noise is multiplied by gain). Incidentally, in the case where the value of the gain is small, depending on the setting of timing and the like, the opposite case is also possible. It should be noted that, the above-mentioned gain is defined by the capacitance ratio between pixel capacitance Cpd and the capacitive device C1 (gain G=(Cpd/C1)), and although G≥1 is satisfied in many cases, G<1 is also possible.

[Modifications]

Now, modifications (modifications 1 to 8) of the above-mentioned embodiment will be described. It should be noted that the same components as those of the embodiment are given the same reference symbols, and their descriptions will be omitted as appropriate.

[Modification 1]

Figure 17:
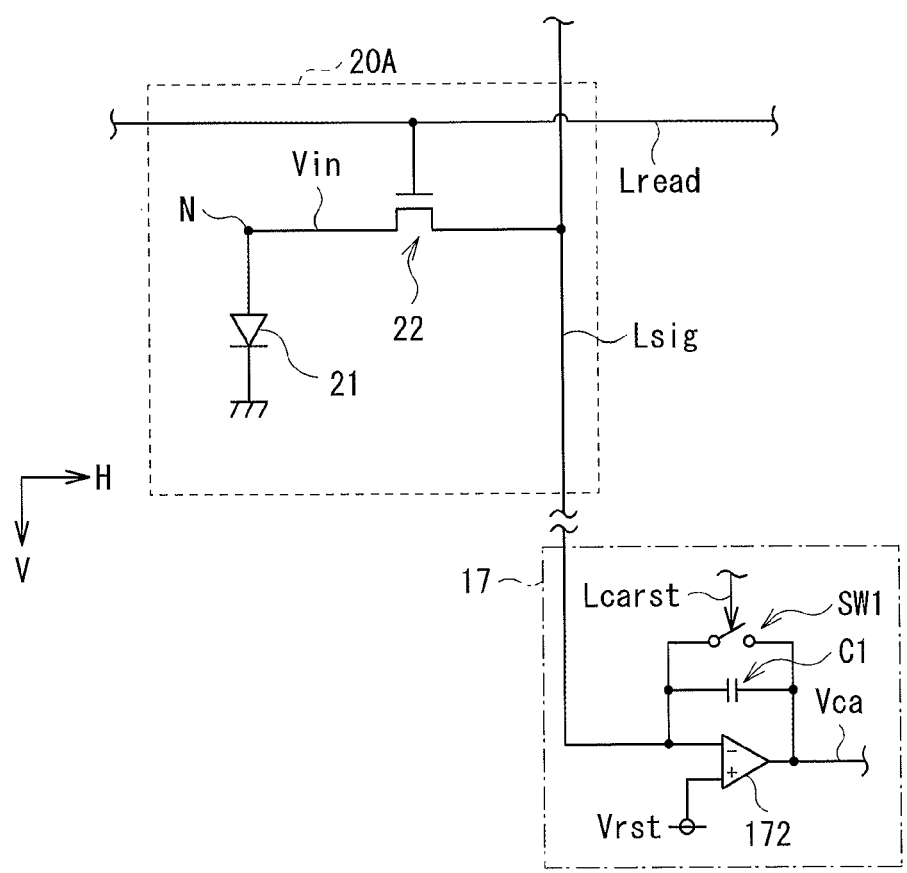
FIG. 17 is a circuit diagram showing a configuration of a pixel and the like according to a modification 1.

FIG. 17 shows a circuit configuration of a pixel (a pixel 20A) according to a modification 1, together with the example of the circuit configuration of the column selection section 17 described in the above-mentioned embodiment. The pixel 20A of the modification 1 has a so-called passive type circuit configuration similarly to the pixel 20 of the embodiment, and includes one photoelectric conversion device 21 and one transistor 22. In addition, the readout control line Lread extending along the H direction, and the signal line Lsig extending along the V direction are connected to the pixel 20A, similarly to the pixel 20.

It is to be noted that the arrangement direction (direction) of the photoelectric conversion device 21 of the pixel 20A is opposite to that of the pixel 20. Specifically, in the pixel 20A, the anode of the photoelectric conversion device 21 is connected to the storage node N, and the cathode of the photoelectric conversion device 21 is connected to the ground (grounded). It is to be noted that the cathode of the photoelectric conversion device 21 may be connected to other power-source potentials than the ground.

Also in an image pickup unit including the pixel 20A having such a configuration, an effect similar to that of the image pickup unit 1 of the above-mentioned embodiment is achieved by a similar function.

[Modifications 2 and 3]
[Circuit Configuration]

Figure 18:
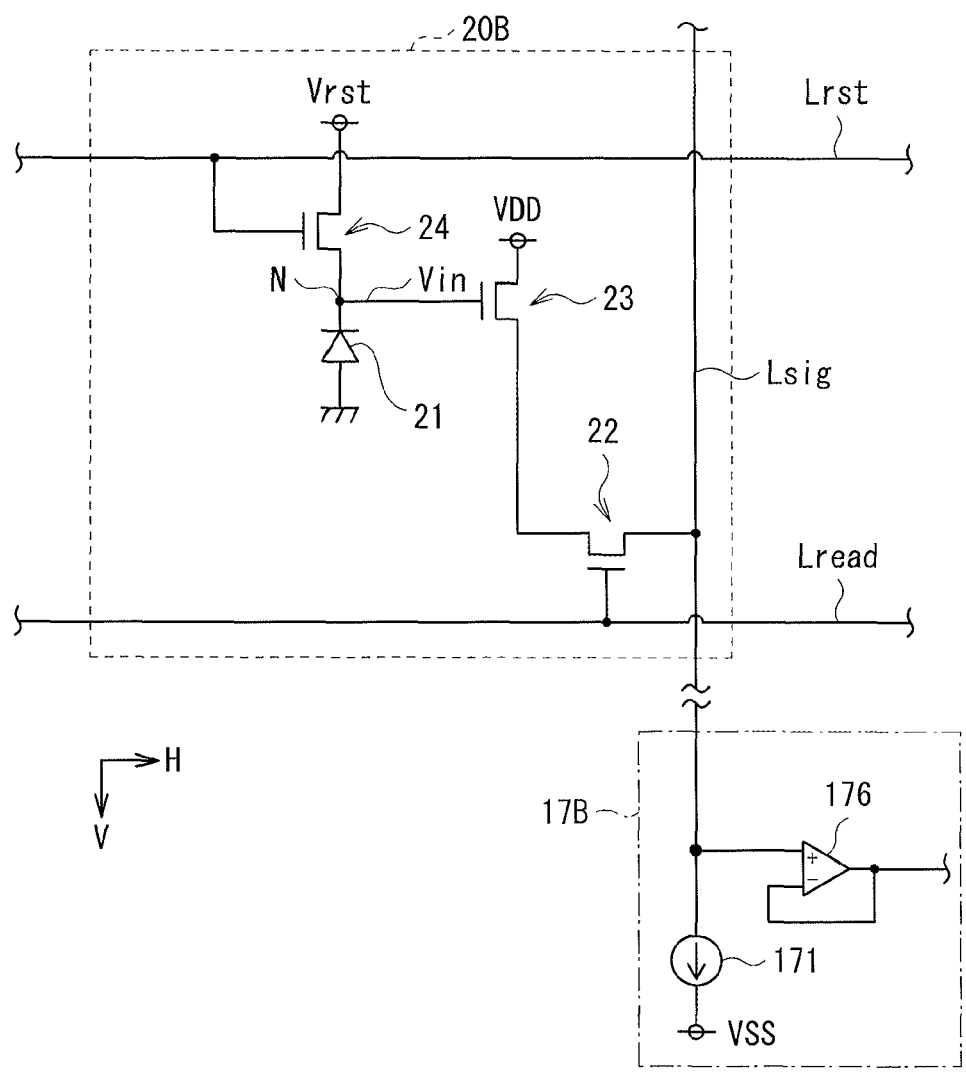
FIG. 18 is a circuit diagram showing a configuration of a pixel and the like according to a modification 2.
Figure 19:
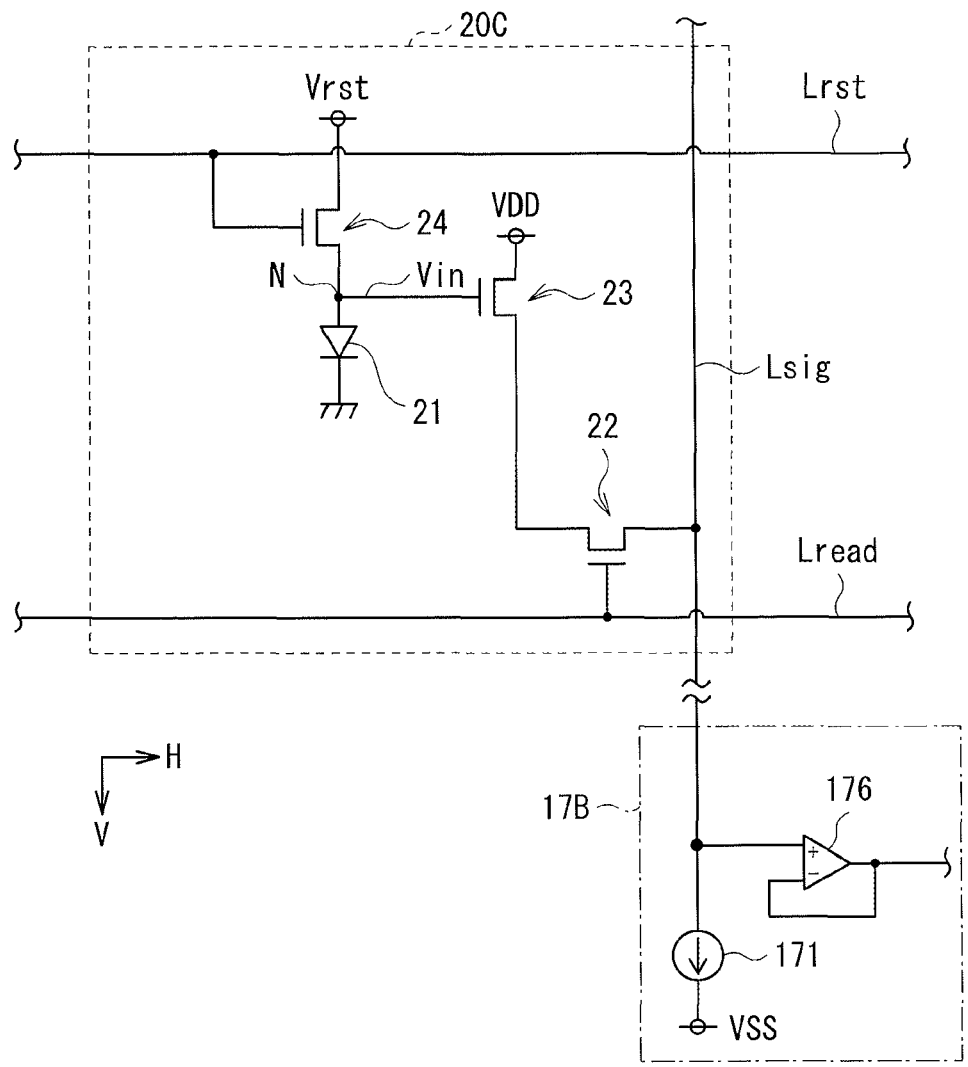
FIG. 19 is a circuit diagram showing a configuration of a pixel and the like according to a modification 3.

FIG. 18 shows a circuit configuration of a pixel (a pixel 20B) according to a modification 2, together with an example of a circuit configuration of a column selection section 17B described below. In addition, FIG. 19 shows a circuit configuration of a pixel (a pixel 20C) according to a modification 3, together with an example of a circuit configuration of the column selection section 17B. The pixels 20B and 20C according to the modifications 2 and 3 each have a so-called active type circuit configuration, unlike the above-described pixels 20 and 20A.

Specifically, the active type pixels 20B and 20C each include one photoelectric conversion device 21 and three transistors 22, 23, and 24. In addition, the readout control line Lread and the reset control line Lrst extending along the H direction, and the signal line Lsig extending along the V direction are connected to each of the pixels 20B and 20C.

In each of the pixels 20B and 20C, a gate of the transistor 22 is connected to the readout control line Lread, a source of the transistor 22 is connected to the signal line Lsig, and a drain of the transistor 22 is connected to a drain of the transistor 23 configuring a source follower circuit. A source of the transistor 23 is connected to the power source VDD, a gate of the transistor 23 is connected to the cathode of the photoelectric conversion device 21 (the pixel 20B illustrated in FIG. 18) or the anode of the photoelectric conversion device 21 (the pixel 20C illustrated in FIG. 19) (the storage node N), and a drain of the transistor 24 serving as a reset transistor. A gate of the transistor 24 is connected to the reset control line Lrst, and a source of the transistor 24 is supplied with the reset voltage Vrst. The anode (the pixel 20B) or the cathode (the pixel 20C) of the photoelectric conversion device 21 is connected to the ground (grounded). It is to be noted that the cathode of the photoelectric conversion device 21 of the pixel 20C may be connected to other power-source potentials than the ground.

In addition, the column selection section 17B according to the modifications 2 and 3 illustrated in FIG. 18 and FIG. 19 includes a constant current source 171 and an amplifier 176, in place of the charge amplifier 172, the capacitive device C1, and the switch SW1 of the above-described column selection section 17. An input terminal on a positive side of the amplifier 176 is connected to the signal line Lsig, and the input terminal on a negative side and the output terminal of the amplifier 176 are connected to each other, thereby forming a voltage follower circuit. It should be noted that one terminal of the constant current source 171 is connected to one end of the signal line Lsig, and the other terminal of the constant current source 171 is connected to a power source VSS.

[Function and Effect]

In the image pickup units of the modifications 2 and 3 respectively including the pixels 20B and 20C having the active type circuit configuration, an image pickup operation (line-sequential image pickup driving) is performed as follows.

Specifically, first, in the image pickup unit including the pixel 20 or 20A having the passive type circuit configuration described so far, the line-sequential image pickup driving is performed as illustrated in FIG. 20A for example. More specifically, the line-sequential readout driving and the line-sequential reset driving are performed by single line-sequential driving (driving intended to perform the line-sequential operation of the readout/first reset period Tr1) at substantially the same time.

In contrast, as in the modifications 2 and 3, in the image pickup unit including the pixel 20B or 20C having the active type circuit configuration, the line-sequential image pickup driving is performed as illustrated in FIG. 20B, for example. Specifically, line-sequential readout driving and line-sequential reset driving for each phase (first line-sequential reset driving and second line-sequential reset driving, in this case) are performed independently and separately from each other. In other words, line-sequential readout driving intended to perform a line-sequential operation of a readout period Tr1$a$, first line-sequential reset driving intended to perform a line-sequential operation of a first pixel reset period (a first reset period Tr1$b$), and second line-sequential reset driving intended to perform a line-sequential operation of a second pixel reset period (a second reset period Tr2) are performed independently and separately from each other. It should be noted that, in the case of the active type circuit configuration, the pixel reset operation of each line-sequential reset driving is performed by turning on the transistor 24 serving as a reset transistor.

As described above, also in the case of the image pickup unit including the pixel 20B or 20C having the active type circuit configuration, an effect similar to that of the case of the passive type circuit configuration described so far is achieved. Specifically, by driving each pixel 20 such that one or both of the end timing of the pixel reset operation and the end timing of the amplifier reset operation are not included in the power-source potential unstable period, it is possible to improve S/N ratio, and improve the quality of a picked-up image.

[Modification 4]

FIGS. 21A to 21C and FIGS. 22A to 22C are timing diagrams each showing an example of image pickup driving according to a modification 4.

Figure 21A:
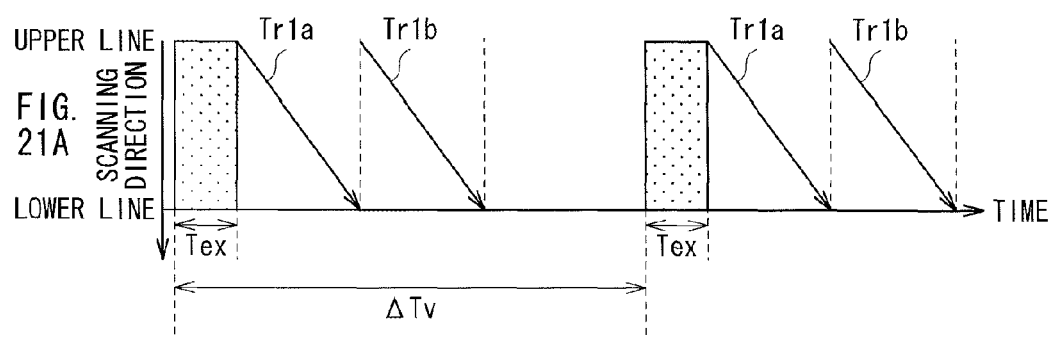
FIGS. 21A to 21C are timing diagrams showing examples of image pickup driving according to a modification 4.
Figure 21B:
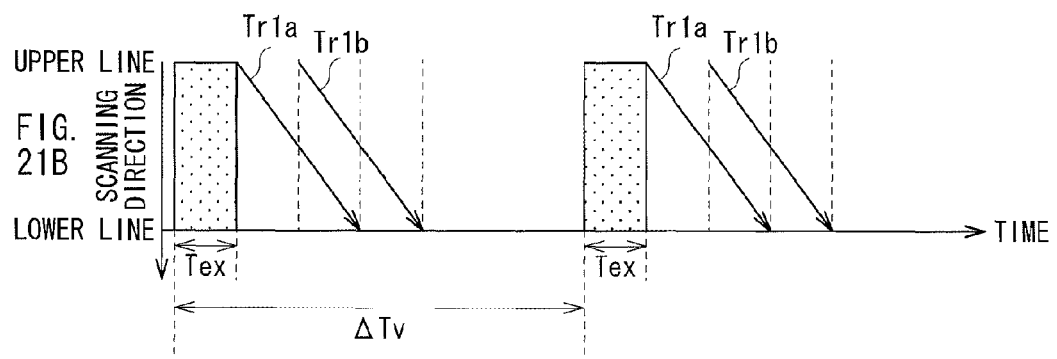

First, in examples illustrated in FIGS. 21A and 21B, the line-sequential readout driving intended to perform the line-sequential operation in the readout period Tr1$a$, and the line-sequential reset driving intended to perform the line-sequential operation in the pixel reset period (a reset period Tr1$b$) are performed independently and separately from each other. Specifically, in the example of FIG. 21A, a period during which the line-sequential readout driving and the line-sequential reset driving overlap with each other is not provided, whereas in the example of FIG. 21B, a period during which the line-sequential readout driving and the line-sequential reset driving overlap with each other is provided.

Figure 21C:
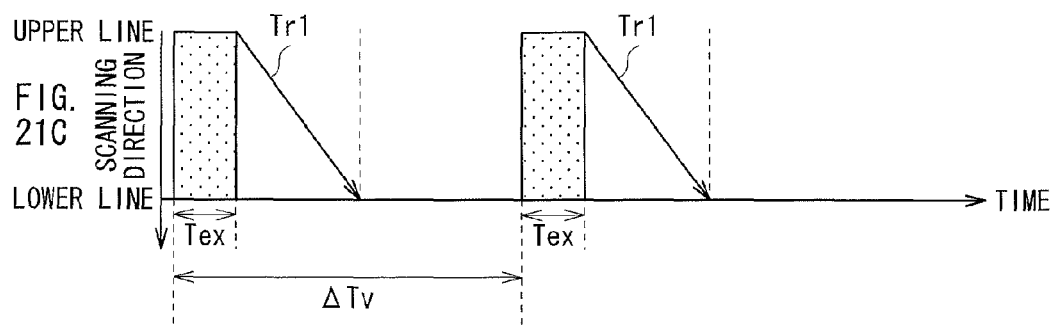

In addition, in the example illustrated in FIG. 21C, only the line-sequential driving intended to perform the line-sequential operation of the read out/reset period Tr1 is performed.

Figure 22A:
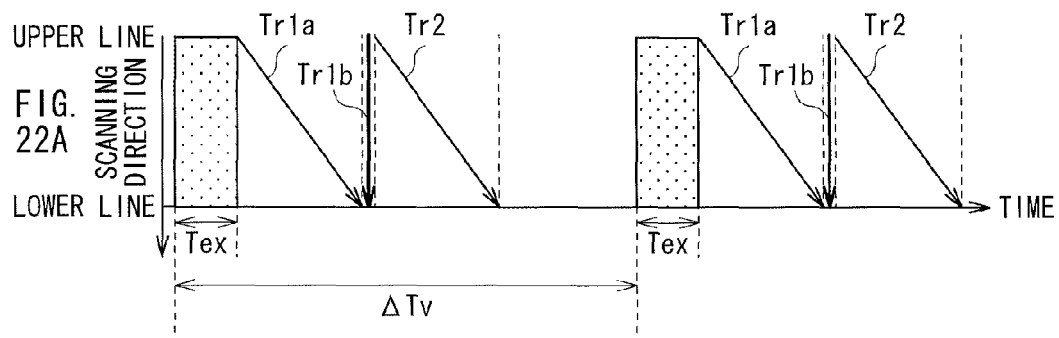
FIGS. 22A to 22C are timing diagrams showing other examples of image pickup driving according to the modification 4.
Figure 22B:
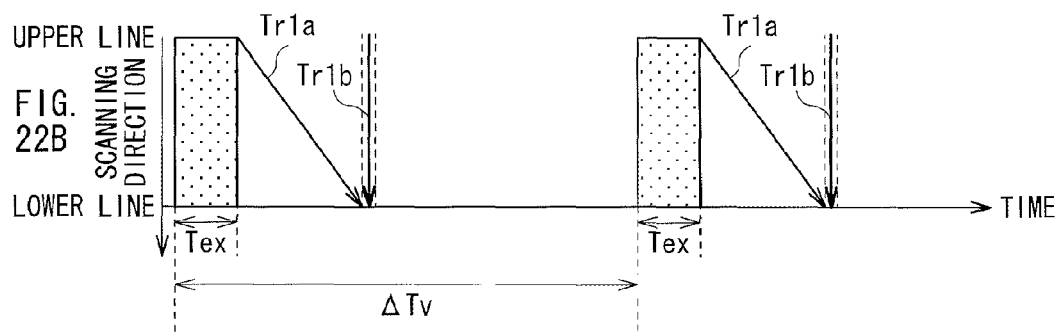
Figure 22C:
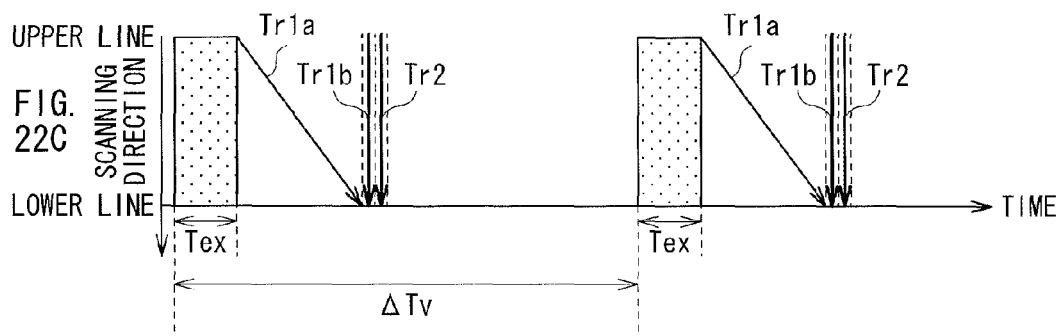

Further, in each of the examples illustrated in FIGS. 22A to 22C, a method of collectively (or simultaneously) performing a reset operation on all of the readout control lines Lread on the horizontal line is used. Specifically, in the example of FIG. 22A, a collective pixel reset period (a first reset period Tr1$b$) is provided between the line-sequential readout driving intended to perform the line-sequential operation of the readout period Tr1$a$, and the line-sequential reset driving intended to perform the line-sequential operation of the second reset period Tr2. On the other hand, in the example of FIG. 22B, the collective pixel reset period (a first reset period Tr1$b$) is provided immediately after the line-sequential readout driving intended to perform the line-sequential operation of the readout period Tr1$a$. Meanwhile, in the example of FIG. 22C, two collective pixel reset periods (a first reset period Tr1$b$ and a second reset period Tr2 in this order) are provided immediately after the line-sequential readout driving intended to perform the line-sequential operation of the readout period Tr1$a$.

As described above, also in the cases where other kinds of image pickup driving are performed, a similar effect is achieved with use of the method of the above-mentioned embodiment. Specifically, by driving each pixel 20 such that one or both of the end timing of the pixel reset operation and the end timing of the amplifier reset operation are not included in the power-source potential unstable period, it is possible to improve S/N ratio, and improve the quality of a picked-up image.

[Modification 5]

Figure 23:
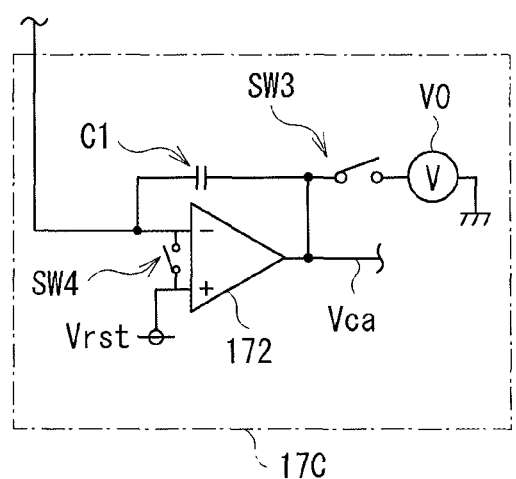
FIG. 23 is a circuit diagram showing a schematic configuration of a column selection section according to a modification 5.

FIG. 23 is a circuit diagram showing a schematic configuration of a column selection section (a column selection section 17C) according to a modification 5. The column selection section 17C of the modification 5 is different from the column selection section 17 of the above-mentioned embodiment in the configuration of the charge amplifier circuit as described below.

Specifically, a switch SW4 is further provided between the input terminal on the positive side of the charge amplifier 172 and the input terminal on the negative side of the charge amplifier 172. In addition, a switch SW3 and a power source V0 (a power source for use in an amplifier reset operation) connected in series in this order are disposed between the output terminal of the charge amplifier 172 and the ground.

As described above, also in the cases where other kinds of charge amplifier circuits are provided, a similar effect is achieved with use of the method of the above-mentioned embodiment. Specifically, by driving each pixel 20 such that one or both of the end timing of the pixel reset operation and the end timing of the amplifier reset operation are not included in the power-source potential unstable period, it is possible to improve S/N ratio, and improve the quality of a picked-up image.

[Modification 6]

Figure 24:
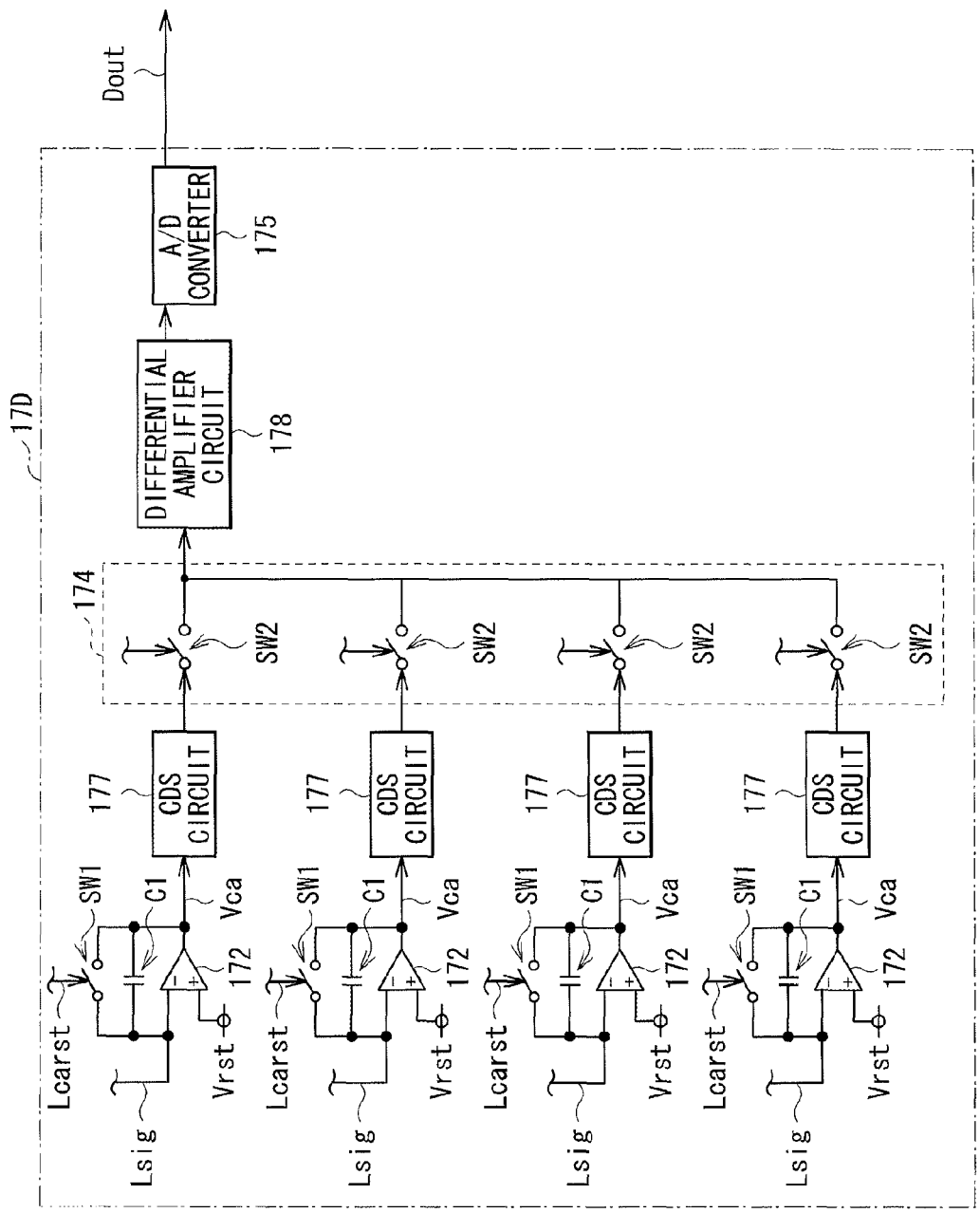
FIG. 24 is a block diagram showing a configuration of a column selection section according to a modification 6.
Figure 25:
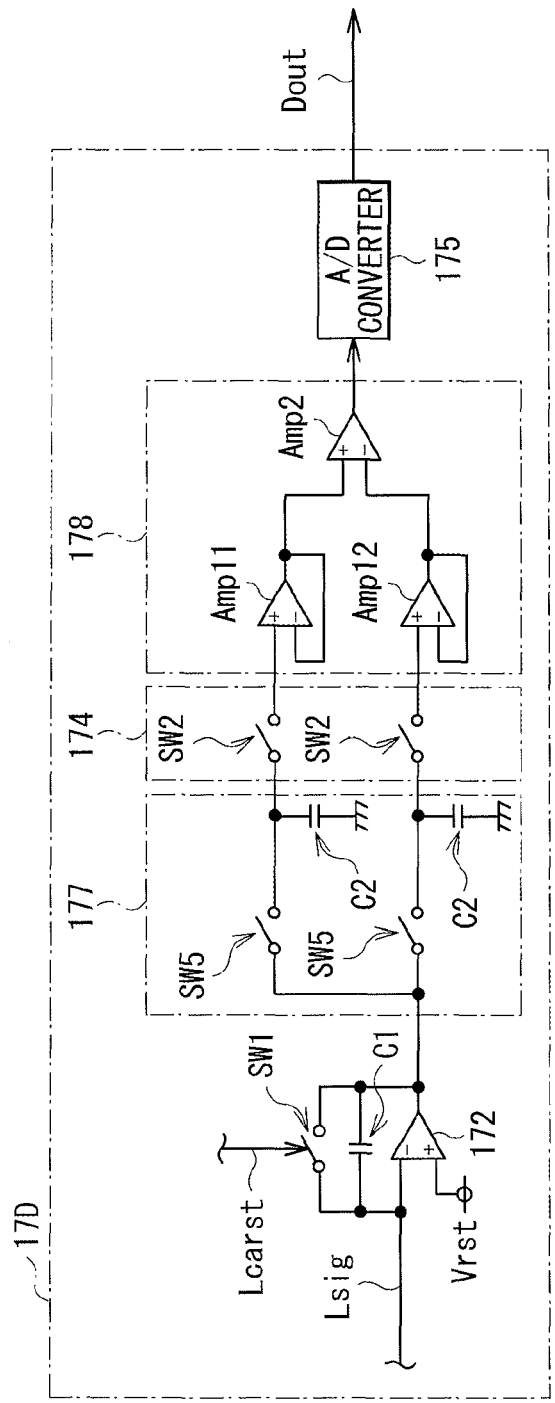
FIG. 25 is a circuit diagram showing a specific configuration example and the like of a CDS circuit and a differential amplifier circuit illustrated in FIG. 24.

FIG. 24 shows a block configuration of a column selection section (a column selection section 17D) according to a modification 6, and FIG. 25 shows a specific example of a circuit configuration of the column selection section 17D.

In place of the S/H circuit 173 of the column selection section 17 (FIG. 4) of the above-mentioned embodiment, the column selection section 17D of the present modification includes a CDS (correlated double sampling) circuit 177. In addition, a differential amplifier circuit 178 is further provided between the multiplexer circuit 174 and the A/D converter 175.

The CDS circuit 177 is a circuit that obtains an image pickup signal from the charge amplifier circuit to perform sampling with correlated timing. Specifically, as illustrated in FIG. 25 for example, the CDS circuit 177 includes two switches SW5 and two capacitive devices C2, which are provided side by side.

As illustrated in FIG. 25 for example, the differential amplifier circuit 178 is a circuit which includes three amplifiers, namely, an Amp 11, an Amp 12, and an Amp 2, and performs a predetermined differential amplifying operation. Specifically, the differential amplifier circuit 178 performs a differential amplifying operation of a signal inputted from one of the switches SW5 and one of the capacitive devices C2 of the CDS circuit 177 through the switch SW2 of the multiplexer circuit 174, and a signal inputted from the other of the switches SW5 and the other of the capacitive devices C2 of the CDS circuit 177 through the switch SW2 of the multiplexer circuit 174.

As described above, also in the case where the column selection section configured by using other circuits such as the CDS circuit 177 and the differential amplifier circuit 178 is provided, a similar effect is achieved with use of the method of the above-mentioned embodiment. Specifically, by driving each pixel 20 such that one or both of the end timing of the pixel reset operation and the end timing of the amplifier reset operation are not included in the power-source potential unstable period, it is possible to improve S/N ratio, and improve the quality of a picked-up image.

[Modifications 7 and 8]

Figure 26A:
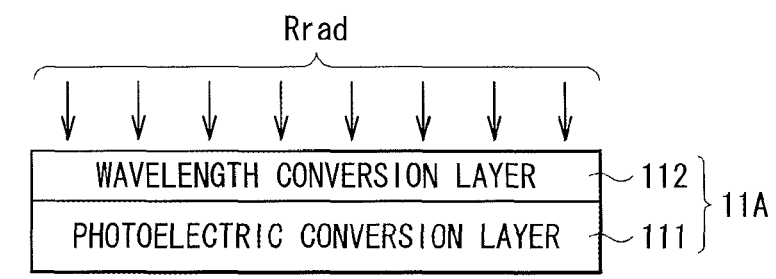
FIGS. 26A and 26B are schematic views showing a schematic configuration of an image pickup section according to a modification 7 and a schematic configuration of an image pickup section according to a modification 8, respectively.
Figure 26B:
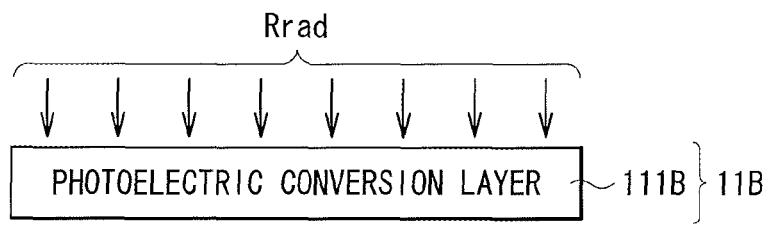

FIGS. 26A and 26B schematically show schematic configurations of image pickup sections (image pickup sections 11A and 11B) according to modifications 7 and 8, respectively.

First, the image pickup section 11A according to the modification 7 illustrated in FIG. 26A further includes a wavelength conversion layer 112 in addition to the photoelectric conversion layer 111 described in the above-mentioned embodiment. Specifically, the wavelength conversion layer 112 is provided on the photoelectric conversion layer 111 (a light receiving surface (image pickup surface) side of the image pickup section 11A).

The wavelength conversion layer 112 converts the wavelength of radiation Rrad (α ray, β ray, γ ray, X-ray, and the like) into a wavelength falling within a sensing range of the photoelectric conversion layer 111, and thus the photoelectric conversion layer 111 is allowed to read information based on the radiation Rrad. The wavelength conversion layer 112 is made of a phosphor (e.g., a scintillator) which converts radiation such as X-ray into visible light, for example. Such a wavelength conversion layer 112 is obtained by forming, on the photoelectric conversion layer 111, an organic planarizing film or a planarizing film made of a spin on glass material or the like, and forming, on the planarizing film, a phosphor film with use of CsI, NaI, $CaF_2$, and the like.

On the other hand, the image pickup section 11B according to the modification 8 illustrated in FIG. 26B includes the photoelectric conversion layer 111B in place of the photoelectric conversion layer 111 described in the above-mentioned embodiment. The photoelectric conversion layer 111B directly generates an electric signal corresponding to incident radiation Rrad. In other words, the image pickup section 11A of the modification 7 illustrated in FIG. 26A is applied to a so-called indirect type radiation image pickup unit, whereas the image pickup section 11B of the modification 8 is applied to a so-called direct type radiation image pickup unit. It should be noted that, the photoelectric conversion layer 111B applied to the direct type radiation image pickup unit is configured of, for example, an amorphous selenium (a-Se) semiconductor, or a cadmium telluride (CdTe) semiconductor.

In the image pickup units according to the modifications 7 and 8 including the image pickup sections 11A and 11B having the above-described configurations, the image pickup sections 11A and 11B each generate an electric signal corresponding to the incident radiation Rrad, and thus the image pickup units according to modifications 7 and 8 each serve as a radiation image pickup unit. Such a radiation image pickup unit is applicable to, for example, a medical unit (X-ray image pickup unit for use in digital radiography and the like), an X-ray image pickup unit for baggage inspection at airport or the like, and an industrial X-ray image pickup unit (e.g., a unit for use in inspection of dangerous goods in container or the like, and a unit for use in inspection of bag contents and the like).

APPLICATION EXAMPLE

Now, an application example of any of the image pickup units according to the embodiment and the modifications (the modifications 1 to 8) to an image pickup display system will be described.

Figure 27:
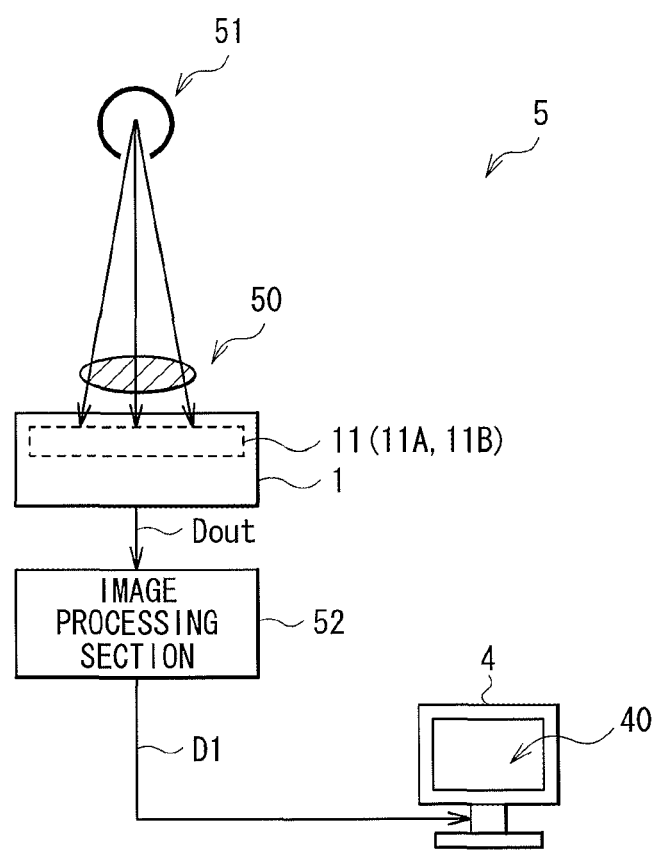
FIG. 27 is a schematic view showing a schematic configuration of an image pickup display system according to an application example.

FIG. 27 schematically shows a schematic configuration of an image pickup display system (an image pickup display system 5) according to the application example. The image pickup display system 5 includes the image pickup unit 1 including the image pickup section 11 (the image pickup sections 11A and 11B) and the like according to the above-mentioned embodiment and so forth, an image processing section 52, and a display 4. In this example, the image pickup display system 5 is configured as an image pickup display system (a radiation image pickup display system) using radiation.

The image processing section 52 performs predetermined image processing on output data Dout (image pickup signal) outputted by the image pickup unit 1 to generate image data D1. The display 4 displays an image based on the image data D1 generated by the image processing section 52 on a predetermined monitor screen 40.

In the image pickup display system 5 having the configuration described above, the image pickup unit 1 (a radiation image pickup unit, in this example) obtains image data Dout of a subject 50 based on irradiation light (radiation, in this example) irradiated toward the subject 50 from a light source (a radiation source such as X-ray source, in this example) 51, and outputs the image data Dout to the image processing section 52. The image processing section 52 performs the above-mentioned predetermined image processing on the inputted image data Dout, outputs the image data (display data) D1 subjected to the image processing to the display 4. The display 4 displays image information (a picked-up image) on the monitor screen 40 based on the inputted image data D1.

As described above, since the image pickup display system 5 of the present application example is capable of obtaining the image of the subject 50 as an electric signal in the image pickup unit 1, it is possible to display an image by transmitting the obtained electric signal to the display 4. Specifically, it is possible to observe the image of the subject 50, and, in addition, to deal with moving image photographing and moving image displaying, without using a radiation photograph film.

It should be noted that, while, in the present application example, an exemplary case has been described in which the image pickup unit 1 is configured as a radiation image pickup unit and an image pickup display system using radiation is adopted, the image pickup display system of the embodiment of the present disclosure may be applied to a system employing an image pickup unit of other systems.

[Other Modifications]

Hereinabove, while the technology of the present disclosure has been described based on the embodiment, the modifications, and the application example, the present technology is not limited to the above-mentioned embodiment and so forth, and various modifications may be made.

For example, the circuit configuration of the pixel in the image pickup section is not limited to those described in the above-mentioned embodiment and so forth (the circuit configurations of the pixels 20, 20A, 20B, and 20C), and other circuit configurations may be adopted. Likewise, the circuit configuration of the row scanning section, the column selection section, and the like, is not limited to those described in the above-mentioned embodiment and so forth, and other circuit configurations may be adopted.

In addition, while, in the above-mentioned embodiment and so forth, an exemplary case has been described in which the pixel reset operation and the amplifier reset operation are performed one time or two times in a predetermined unit period (one frame period), this is not limitative. In other words, for example, the pixel reset operation and the amplifier reset operation may be performed three times or more in one frame period.

Further, the image pickup section, the row scanning section, the A/D conversion section (the column selection section), the column scanning section, and the like described in the above-mentioned embodiment and so forth may be formed on the same substrate, for example. Specifically, for example, by using a polycrystalline semiconductor such as a low-temperature multicrystalline silicon, the switch and the like of these circuit parts may also be formed on the same substrate. Consequently, for example, it is possible to perform driving operation on the same substrate based on a control signal from an external system control section, and to realize reduction in frame width (a frame structure of three-side free) and reliability enhancement at the time of wiring connection.

Note that the present technology may be configured as follows.

(1) An image pickup unit including:
an image pickup section including a plurality of pixels, each of the pixels including a photoelectric conversion device; and
a driving section that includes an amplifier and drives each of the pixels to perform a read out operation intended to read out electric charge obtained by the photoelectric conversion device from the pixel as a signal with use of the amplifier, a pixel reset operation intended to reset electric charge in the pixel, and an amplifier reset operation intended to reset an operation of the amplifier, wherein
the driving section drives each of the pixels to allow one or both of end timing of the pixel reset operation and end timing of the amplifier reset operation not to be included in a predetermined power-source potential unstable period.

(2) The image pickup unit according to (1), wherein the driving section drives each of the pixels to allow the end timing of the pixel reset operation not to be included in the power-source potential unstable period.

(3) The image pickup unit according to (2), wherein the driving section drives each of the pixels to allow both the end timing of the pixel reset operation and the end timing of the amplifier reset operation not to be included in the power-source potential unstable period.

(4) The image pickup unit according to (1), wherein the driving section drives each of the pixels to allow the end timing of the amplifier reset operation not to be included in the power-source potential unstable period.

(5) The image pickup unit according to any one of (1) to (4), wherein a period of the pixel reset operation and a period of the amplifier reset operation overlap with each other at least in part.

(6) The image pickup unit according to (5), wherein the entire period of the pixel reset operation is included in the period of the amplifier reset operation.

(7) The image pickup unit according to (5), wherein the period of the pixel reset operation and the period of the amplifier reset operation coincide with each other.

(8) The image pickup unit according to any one of (1) to (7), wherein the driving section drives each of the pixels to allow the entire period of the pixel reset operation or the entire period of the amplifier reset operation not to be included in the power-source potential unstable period.

(9) The image pickup unit according to any one of (1) to (8), wherein the driving section includes:
a multiplexer circuit selecting a part of the signal read out with use of the amplifier; and
an A/D converter performing A/D conversion on the signal selected by the multiplexer circuit, and
the power-source potential unstable period includes one or both of an operation period of the multiplexer circuit and an operation period of the A/D converter.

(10) The image pickup unit according to any one of (1) to (9), wherein the driving section drives each of the pixels to allow the pixel reset operation to be intermittently performed multiple times in a predetermined unit period.

(11) The image pickup unit according to (10), wherein the pixel reset operation is intermittently performed multiple times over a period longer than one horizontal period.

(12) The image pickup unit according to any one of (1) to (11), wherein
the image pickup section generates an electric signal corresponding to incident radiation, and
the image pickup unit serves as a radiation image pickup unit.

(13) The image pickup unit according to (12), wherein the image pickup section includes:
a photoelectric conversion layer configuring the photoelectric conversion device; and
a wavelength conversion layer converting a wavelength of the radiation into a wavelength falling within a sensing range of the photoelectric conversion layer.

(14) The image pickup unit according to (12), wherein the image pickup section includes a photoelectric conversion layer configured to directly generate the electric signal corresponding to the radiation, the photoelectric conversion layer configuring the photoelectric conversion device.

(15) The image pickup unit according to any one of (12) to (14), wherein the radiation is X-ray.

(16) An image pickup display system including an image pickup unit and a display that performs an image display based on an image pickup signal obtained by the image pickup unit, the image pickup unit including:
an image pickup section including a plurality of pixels, each of the pixels including a photoelectric conversion device; and
a driving section that includes an amplifier and drives each of the pixels to perform a read out operation intended to read out electric charge obtained by the photoelectric conversion device from the pixel as a signal with use of the amplifier, a pixel reset operation intended to reset electric charge in the pixel, and an amplifier reset operation intended to reset an operation of the amplifier, wherein
the driving section drives each of the pixels to allow one or both of end timing of the pixel reset operation and end timing of the amplifier reset operation not to be included in a predetermined power-source potential unstable period.

The present disclosure contains subject matter related to that disclosed in Japanese Priority Patent Application JP 2011-240135 filed in the Japan Patent Office on Nov. 1, 2011, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An image pickup unit comprising:
an image pickup section including a plurality of pixels, each of the pixels including a photoelectric conversion device; and
a driving section that includes an amplifier and drives each of the pixels to perform a read out operation intended to read out electric charge obtained by the photoelectric conversion device from the pixel as a signal with use of the amplifier, a pixel reset operation intended to reset electric charge in the pixel, and an amplifier reset operation intended to reset an operation of the amplifier, wherein:
the driving section drives each of the pixels to allow one or both of end timing of the pixel reset operation and end timing of the amplifier reset operation not to be included in a predetermined power-source potential unstable period;
a period of the amplifier reset operation overlap with each other at least in part; and
the entire period of the pixel reset operation is included in the period of the amplifier reset operation.

2. The image pickup unit according to claim 1, wherein the driving section drives each of the pixels to allow the end timing of the pixel reset operation not to be included in the power-source potential unstable period.

3. The image pickup unit according to claim 2, wherein the driving section drives each of the pixels to allow both the end timing of the pixel reset operation and the end timing of the amplifier reset operation not to be included in the power-source potential unstable period.

4. The image pickup unit according to claim 1, wherein the driving section drives each of the pixels to allow the end timing of the amplifier reset operation not to be included in the power-source potential unstable period.

5. The image pickup unit according to claim 1, wherein the period of the pixel reset operation and the period of the amplifier reset operation coincide with each other.

6. The image pickup unit according to claim 1, wherein the driving section drives each of the pixels to allow the entire period of the pixel reset operation or the entire period of the amplifier reset operation not to be included in the power-source potential unstable period.

7. The image pickup unit according to claim 1, wherein the driving section drives each of the pixels to allow the pixel reset operation to be intermittently performed multiple times in a predetermined unit period.

8. The image pickup unit according to claim 7, wherein the pixel reset operation is intermittently performed multiple times over a period longer than one horizontal period.

9. The image pickup unit according to claim 1, wherein
the image pickup section generates an electric signal corresponding to incident radiation, and
the image pickup unit serves as a radiation image pickup unit.

10. The image pickup unit according to claim 9, wherein the image pickup section includes:
a photoelectric conversion layer configuring the photoelectric conversion device; and
a wavelength conversion layer converting a wavelength of the radiation into a wavelength falling within a sensing range of the photoelectric conversion layer.

11. The image pickup unit according to claim 9, wherein the image pickup section includes a photoelectric conversion layer configured to directly generate the electric signal corresponding to the radiation, the photoelectric conversion layer configuring the photoelectric conversion device.

12. The image pickup unit according to claim 9, wherein the radiation is X-ray.

13. An image pickup unit comprising:
an image pickup section including a plurality of pixels, each of the pixels including a photoelectric conversion device; and
a driving section that includes an amplifier and drives each of the pixels to perform a read out operation intended to read out electric charge obtained by the photoelectric conversion device from the pixel as a signal with use of the amplifier, a pixel reset operation intended to reset electric charge in the pixel, and an amplifier reset operation intended to reset an operation of the amplifier, wherein the driving section drives each of the pixels to allow one or both of end timing of the pixel reset operation and end timing of the amplifier reset operation not to be included in a predetermined power-source potential unstable period, and wherein the driving section includes:
a multiplexer circuit selecting a part of the signal read out with use of the amplifier; and
an A/D converter performing A/D conversion on the signal selected by the multiplexer circuit, and
the power-source potential unstable period includes one or both of an operation period of the multiplexer circuit and an operation period of the A/D converter.

* * * * *